US012528795B2

United States Patent
Wang et al.

(10) Patent No.: US 12,528,795 B2
(45) Date of Patent: Jan. 20, 2026

(54) CRYSTAL FORM OF MULTI-SUBSTITUTED BENZENE RING COMPOUND MALEATE, AND PREPARATION METHOD THEREFOR AND USE THEREOF

(71) Applicant: EVOPOINT BIOSCIENCES CO., LTD., Jiangsu (CN)

(72) Inventors: Xufan Wang, Jiangsu (CN); Qiuping Weng, Jiangsu (CN); Wengui Wang, Jiangsu (CN); Xin Li, Jiangsu (CN); Yonghan Hu, Jiangsu (CN)

(73) Assignee: EVOPOINT BIOSCIENCES CO., LTD., Jiangsu (CN)

( * ) Notice: Subject to any disclaimer, the term of this patent is extended or adjusted under 35 U.S.C. 154(b) by 476 days.

(21) Appl. No.: 18/247,281

(22) PCT Filed: Oct. 12, 2021

(86) PCT No.: PCT/CN2021/123172
§ 371 (c)(1),
(2) Date: Mar. 30, 2023

(87) PCT Pub. No.: WO2022/078307
PCT Pub. Date: Apr. 21, 2022

(65) Prior Publication Data
US 2023/0382898 A1 Nov. 30, 2023

(30) Foreign Application Priority Data
Oct. 13, 2020 (CN) .......................... 202011088764.2

(51) Int. Cl.
*C07D 405/12* (2006.01)
(52) U.S. Cl.
CPC ........ *C07D 405/12* (2013.01); *C07B 2200/13* (2013.01)
(58) Field of Classification Search
CPC .......................... C07D 405/12; C07B 2200/13
See application file for complete search history.

(56) References Cited

U.S. PATENT DOCUMENTS

2019/0367482 A1  12/2019  Liu et al.
2021/0308141 A1  10/2021  Peng et al.

FOREIGN PATENT DOCUMENTS

| CN | 104080769 A | 10/2014 |
| CN | 108314677 A | 7/2018 |
| WO | 2013075083 A1 | 5/2013 |
| WO | 2013173441 A2 | 11/2013 |
| WO | 2014049488 A1 | 4/2014 |
| WO | 2020020374 A1 | 1/2020 |

OTHER PUBLICATIONS

Extended European Search Report issued on Sep. 16, 2024 by EPO for a corresponding Patent Application EP21879351.1.
Jun. 24, 2025 Japanese First Office Action issued in Japanese Patent Application No. 2023522753.
May 6, 2025 Chinese First Office Action issued in Chinese Patent Application No. 2021800686635.
Apr. 25, 2025 First Search Report issued in Chinese Patent Application No. 2021800686635.
Jan. 21, 2022 International Search Report issued in International Patent Application No. PCT/CN2021/123172.
Jan. 21, 2022 International Written Opinion issued in International Patent Application No. PCT/CN2021/123172.

*Primary Examiner* — Joseph K McKane
*Assistant Examiner* — Quincy McKoy
(74) *Attorney, Agent, or Firm* — Houston Beshining Law Office PLLC; Liangang Ye

(57) ABSTRACT

Provided are a crystal form of a multi-substituted benzene ring compound maleate, and a preparation method therefor and the use thereof. The crystal form of the multi-substituted benzene ring compound salt represented by formula II has good physicochemical stability, high solubility, less hygroscopicity, good flowability and more preparation process options, and is more suitable for industrial production, which is of great value for drug optimization and development.

formula II

17 Claims, 7 Drawing Sheets

CRYSTAL FORM OF MULTI-SUBSTITUTED BENZENE RING COMPOUND MALEATE, AND PREPARATION METHOD THEREFOR AND USE THEREOF

The present application is a National Stage of International Application No. PCT/CN2021/123172, filed on Oct. 12, 2021, which claims priority to Chinese Patent Application No. 2020110887642 filed on Oct. 13, 2020, which is incorporated herein by reference in its entirety.

TECHNICAL FIELD

The present invention relates to a crystal form of maleate of a multi-substituted benzene ring compound, a method for preparing the same and use thereof.

BACKGROUND

There is a multi-substituted benzene ring compound having a structure as shown in formula I:

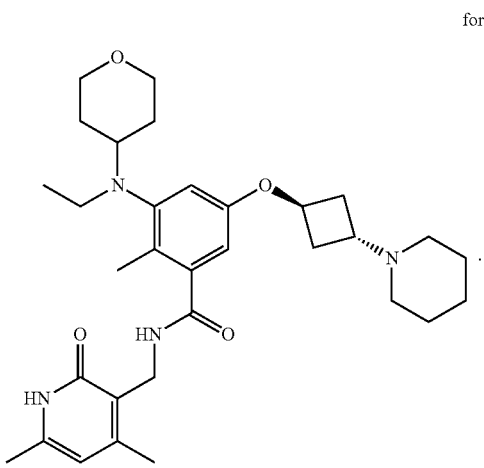

formula I

The compound has been disclosed in patent WO2020020374A1. It is an enhancer of Zeste homolog 2 (EZH2) inhibitor, and can be used for preventing or treating EZH2-mediated diseases, including brain cancer, thyroid cancer, cardiac sarcoma, lung cancer, oral cancer, stomach cancer and various other cancers.

The phenomenon that a substance can exist in two or more different crystal structures is called polymorphism. For drugs, this polymorphism may affect the absorption of the drugs, and thus the bioavailability of the drugs, thereby showing different clinical efficacy and toxic and side effects. In view of this, it is of great significance to develop an advantageous crystal form of a salt of the multi-substituted benzene ring compound of formula I with advantageous properties.

In the research and development process of drugs, solubility and hygroscopicity are both factors to be considered in the research and development of the drugs, but there is usually a certain correlation between the two indexes of solubility and hygroscopicity. Active raw materials which are easily soluble in water can also absorb water, so substances with high solubility are usually more hygroscopic. Therefore, it is of great significance to develop a compound with high solubility and low hygroscopicity for the research and development of the drugs.

SUMMARY

The present invention aims to solve the technical problems to overcome the defects of low solubility and higher hygroscopicity of a multi-substituted benzene ring compound of formula I in the process of preparing a drug in the prior art, and thus provides a crystal form of a salt of the multi-substituted benzene ring compound of formula II, a method for preparing the same and use thereof. The crystal form has good physical and chemical stability, high solubility, lower hygroscopicity, good fluidity and more preparation process options, and is more suitable for industrial production, which is of great value for drug optimization and development.

The present invention provides a crystal form A of maleate of the multi-substituted benzene ring compound of formula II having an X-ray powder diffraction pattern comprising diffraction peaks at 2θ angles of 7.39±0.2°, 8.78±0.2°, 13.99±0.2°, 15.21±0.2°, 15.73±0.2°, 17.75±0.2°, 18.51±0.2°, and 21.06±0.2°;

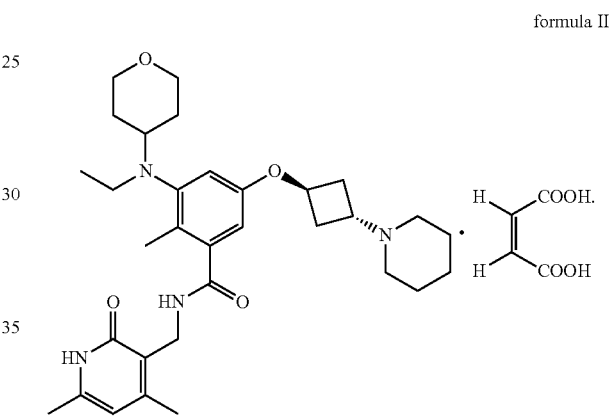

formula II

The crystal form A of maleate of the multi-substituted benzene ring compound of formula II can have an X-ray powder diffraction pattern further comprising diffraction peaks at one or more of the following 2θ angles: 8.51±0.2° and 16.06±0.2°.

The crystal form A of maleate of the multi-substituted benzene ring compound of formula II can have an X-ray powder diffraction pattern further comprising diffraction peaks at one or more of the following 2θ angles: 18.20±0.2° and 20.68±0.2°.

The crystal form A of maleate of the multi-substituted benzene ring compound of formula II can have an X-ray powder diffraction pattern further comprising diffraction peaks at one or more of the following 2θ angles: 22.81±0.2° and 25.28±0.2°.

The crystal form A of maleate of the multi-substituted benzene ring compound of formula II can have an X-ray powder diffraction pattern comprising diffraction peaks at 2θ angles with relative intensities as shown in Table 1;

TABLE 1

| Diffraction peak number | 2θ angle (°) | Relative intensity (%) |
|---|---|---|
| 1 | 7.39 ± 0.2 | 42.64 |
| 2 | 8.51 ± 0.2 | 12.59 |
| 3 | 8.78 ± 0.2 | 37.91 |
| 4 | 11.79 ± 0.2 | 4.22 |

TABLE 1-continued

| Diffraction peak number | 2θ angle (°) | Relative intensity (%) |
|---|---|---|
| 5 | 12.73 ± 0.2 | 3.84 |
| 6 | 13.99 ± 0.2 | 56.77 |
| 7 | 15.21 ± 0.2 | 100.00 |
| 8 | 15.73 ± 0.2 | 88.27 |
| 9 | 16.06 ± 0.2 | 17.68 |
| 10 | 17.75 ± 0.2 | 67.49 |
| 11 | 17.91 ± 0.2 | 32.21 |
| 12 | 18.20 ± 0.2 | 25.80 |
| 13 | 18.51 ± 0.2 | 42.40 |
| 14 | 19.13 ± 0.2 | 1.87 |
| 15 | 19.80 ± 0.2 | 1.17 |
| 16 | 20.68 ± 0.2 | 24.70 |
| 17 | 21.06 ± 0.2 | 66.84 |
| 18 | 21.32 ± 0.2 | 13.09 |
| 19 | 22.11 ± 0.2 | 9.65 |
| 20 | 22.81 ± 0.2 | 22.28 |
| 21 | 23.07 ± 0.2 | 5.24 |
| 22 | 23.66 ± 0.2 | 9.98 |
| 23 | 23.84 ± 0.2 | 8.90 |
| 24 | 24.41 ± 0.2 | 5.27 |
| 25 | 24.68 ± 0.2 | 12.31 |
| 26 | 25.28 ± 0.2 | 57.69 |
| 27 | 25.62 ± 0.2 | 23.51 |
| 28 | 26.23 ± 0.2 | 10.60 |
| 29 | 26.68 ± 0.2 | 16.79 |
| 30 | 26.84 ± 0.2 | 12.91 |
| 31 | 28.06 ± 0.2 | 20.35 |
| 32 | 29.11 ± 0.2 | 3.72 |
| 33 | 29.41 ± 0.2 | 10.37 |
| 34 | 29.67 ± 0.2 | 5.16 |
| 35 | 29.99 ± 0.2 | 16.33 |
| 36 | 30.86 ± 0.2 | 3.90 |
| 37 | 32.44 ± 0.2 | 1.66 |
| 38 | 33.38 ± 0.2 | 4.28 |
| 39 | 34.46 ± 0.2 | 1.45 |
| 40 | 35.33 ± 0.2 | 2.75 |
| 41 | 36.50 ± 0.2 | 2.36 |
| 42 | 37.08 ± 0.2 | 4.26 |
| 43 | 38.33 ± 0.2 | 4.65 |

The crystal form A of maleate of the multi-substituted benzene ring compound of formula II can further have an X-ray powder diffraction pattern expressed in terms of 2θ angles substantially as shown in FIG. 1.

In the present invention, the X-ray powder diffraction patterns are all measured using Kα radiation of Cu target.

In the present invention, the crystal form A of maleate of the multi-substituted benzene ring compound of formula II can have a differential scanning calorimetry (DSC) pattern comprising main endothermic peaks at 185.3±3° C. and 204.4±3° C.

In the present invention, the crystal form A of maleate of the multi-substituted benzene ring compound of formula II can further have a DSC pattern substantially as shown in FIG. 2.

In the present invention, the crystal form A of maleate of the multi-substituted benzene ring compound of formula II can further have a thermogravimetric analysis (TGA) pattern substantially as shown in FIG. 3.

The present invention further provides a method for preparing the crystal form A of maleate of the multi-substituted benzene ring compound of formula II, which is method 1, method 2, method 3, method 4, method 5, or method 6:

method 1: reacting a multi-substituted benzene ring compound of formula I with maleic acid in a solvent A;
wherein the solvent A is selected from one or more of methyl isobutyl ketone, 2-methyltetrahydrofuran, and ethyl acetate;

method 2: mixing a crystal form B of maleate of the multi-substituted benzene ring compound of formula II with a solvent B to form a suspension solution, and then stirring;
wherein the solvent B is selected from one or more of an alcohol solvent, an ester solvent, a ketone solvent, an ether solvent, a benzene solvent, and a nitrile solvent;

method 3: mixing a crystal form B of maleate of the multi-substituted benzene ring compound of formula II with a mixed solvent of dimethyl sulfoxide and ethyl acetate to form a saturated solution, and then crystallizing;

method 4: dissolving a crystal form B of maleate of the multi-substituted benzene ring compound of formula II in a solvent C, adding a solvent D, and then crystallizing;
wherein the solvent C is selected from one or more of methanol, dimethyl sulfoxide and trichloromethane, and when the solvent C is methanol, the solvent D is ethyl acetate; when the solvent C is dimethyl sulfoxide, the solvent D is isopropyl acetate; when the solvent C is trichloromethane, the solvent D is one or more of ethyl acetate, acetonitrile and butanone;

method 5: performing a gas-liquid infiltration crystallization experiment on a crystal form B of maleate of the multi-substituted benzene ring compound of formula II;
wherein a good solvent is methanol, and an anti-solvent is selected from one or more of acetone, ethyl acetate and tetrahydrofuran; and method 6: performing a gas-solid infiltration experiment on a crystal form B of maleate of the multi-substituted benzene ring compound of formula II in a solvent E;
wherein the solvent E is one or more of methanol, acetonitrile, acetone, dimethyl sulfoxide, isopropanol, and dimethylformamide.

In the above methods 2-6, the crystal form B of maleate of the multi-substituted benzene ring compound of formula II has an X-ray powder diffraction pattern expressed in terms of 2θ angles substantially as shown in FIG. 4.

In method 1, the reaction can be performed at a conventional temperature in the art, preferably at room temperature.

In method 1, the reaction can be performed for a conventional period in the art, preferably for 2-4 days.

In method 1, a molar ratio of the multi-substituted benzene ring compound of formula I to maleic acid can be conventional in the art, preferably 1:(1-1.2), such as 1:1.07.

In method 1, a volume-to-mass ratio of the solvent A to the multi-substituted benzene ring compound of formula I can be conventional in the art, preferably 15-40 mL/g, such as 17.6 mL/g.

In method 2, the stirring can be conventional in the art, preferably magnetic stirring.

In method 2, the stirring can be performed at a conventional temperature in the art, preferably at 0-50° C., such as room temperature, 50° C. or a temperature cycle of 50° C. to 5° C. at 0.1° C./min. When the stirring is performed at 50° C., the stirring is performed for 5-8 days; when the stirring is performed at room temperature, the stirring is performed for 25-35 days; when the stirring is performed at a temperature cycle, the stirring is performed at the temperature cycle of 50° C. to 5° C. at 0.1° C./min for 2-4 cycles.

In method 2, the alcohol solvent can be conventional in the art, preferably ethanol and/or isopropanol.

In method 2, the ester solvent can be conventional in the art, preferably ethyl acetate and/or isopropyl acetate.

In method 2, the ketone solvent can be conventional in the art, preferably one or more of acetone, butanone, and methyl isobutyl ketone.

In method 2, the ether solvent can be conventional in the art, preferably one or more of anisole, cyclopentyl methyl ether and methyl tert-butyl ether, and more preferably anisole and/or cyclopentyl methyl ether.

In method 2, the benzene solvent can be conventional in the art, preferably toluene.

In method 2, the nitrile solvent can be conventional in the art, preferably acetonitrile.

In method 2, a volume-to-mass ratio of the solvent B to the crystal form B of maleate of the multi-substituted benzene ring compound of formula II can be conventional in the art, preferably 20-50 mL/g, such as 25 mL/g.

In method 3, a volume ratio of dimethyl sulfoxide and ethyl acetate in the mixed solvent can be conventional in the art, preferably 1:(2-5), such as 1:3.

In method 3, a volume-to-mass ratio of the mixed solvent to the crystal form B of maleate of the multi-substituted benzene ring compound of formula II can be conventional in the art, preferably 20-50 mL/g, such as 25 mL/g.

In method 4, the solvent D can be added in a conventional manner in the art, preferably added dropwise.

In method 4, a volume ratio of the solvent D to the solvent C can be conventional in the art, preferably (7-15):1, such as 9:1.

In method 5, the gas-liquid infiltration experiment can be performed at a conventional temperature in the art, preferably at room temperature.

In method 5, a volume ratio of the anti-solvent to the good solvent can be conventional in the art, preferably (7-15):1, such as 8:1.

In method 6, the gas-solid infiltration experiment can be performed at a conventional temperature in the art, preferably at room temperature.

In method 6, the gas-solid infiltration experiment can be performed for a conventional period in the art, preferably for 20-50 days, such as 30 days.

In method 6, a volume-to-mass ratio of the solvent E to the crystal form B of maleate of the multi-substituted benzene ring compound of formula II can be conventional in the art, preferably 100-400 mL/g, such as 200 mL/g.

In methods 3-5, the solution can be prepared with reference to the conventional preparation methods in the art, for example, using a preparation method for a saturated solution, preferably, the saturated solution is filtered, preferably through a filter membrane.

In methods 3-5, the crystallization can be performed in a conventional manner for such operation in the art.

For example, in method 3, the crystallization is preferably performed by slow cooling from 50° C. to 5° C. at a rate of 0.1-0.5° C./min, preferably 0.1° C./min, and if the solution is still clear, it is transferred to room temperature for volatilization.

For example, in method 4, preferably, there is a solid precipitated after adding the solvent D; if there is no solid precipitated, the temperature is reduced to 5° C.; if there is still no solid precipitated, the solution is transferred to room temperature for volatilization or dried in vacuum at 50° C.

For example, in method 5, the crystallization is preferably performed at room temperature or by drying in vacuum at 50° C.

Methods 1-6 can further comprise the following post-treatment steps: separating and drying. The separating can be performed in a conventional manner in the art, preferably by centrifuging or filtering. The drying can be conventional in the art, preferably drying in vacuum.

Preferably, the crystal form B of maleate of the multi-substituted benzene ring compound of formula II is prepared by the following method: dissolving a multi-substituted benzene ring compound of formula I and maleic acid in ethanol, cooling for crystallization, and adding methyl tert-butyl ether.

In the method for preparing the crystal form B of maleate of the multi-substituted benzene ring compound of formula II, a molar ratio of the multi-substituted benzene ring compound of formula I to maleic acid can be conventional in the art, preferably 1:(0.95-0.98), such as 1:0.978.

In the method for preparing the crystal form B of maleate of the multi-substituted benzene ring compound of formula II, a mass ratio of ethanol to the multi-substituted benzene ring compound of formula I can be conventional in the art, preferably (7-9):1, such as 6.9:1.

In the method for preparing the crystal form B of maleate of the multi-substituted benzene ring compound of formula II, the cooling for crystallization can be performed at a conventional temperature in the art, preferably at 15-25° C., such as 20° C.

In the method for preparing the crystal form B of maleate of the multi-substituted benzene ring compound of formula II, a mass ratio of the methyl tert-butyl ether to the multi-substituted benzene ring compound of formula I can be conventional in the art, preferably (12-15):1, such as 13:1.

The method for preparing the crystal form B of maleate of the multi-substituted benzene ring compound of formula II can further comprise the following post-treatment steps: filtering and drying, wherein the conditions and procedures for the filtering can be conventional conditions and procedures for such operation in the art, and preferably, methyl tert-butyl ether is further added to a filter cake obtained by filtering for washing; the conditions and procedures for the drying can be conventional conditions and procedures for such operation in the art.

The present invention further provides a pharmaceutical composition comprising the crystal form A of maleate of the multi-substituted benzene ring compound of formula II, and a pharmaceutically acceptable carrier.

The crystal form A of maleate of the multi-substituted benzene ring compound of formula II or the pharmaceutical composition of the present invention described above can be used for treating and/or preventing EZH2-mediated diseases. Preferably, the EZH2-mediated diseases include cancer, pulmonary hypertension, myelofibrosis, human immunodeficiency virus (HIV) disease, graft versus host disease (GVHD), Weaver syndrome, psoriasis, and hepatic fibrosis. More preferably, the EZH2-mediated disease is a cancer.

Preferably, the cancer includes metastatic or malignant tumors.

Preferably, the cancer includes brain cancer, thyroid cancer, cardiac sarcoma, lung cancer, oral cancer, stomach cancer, liver cancer, kidney cancer, pancreatic cancer, esophageal cancer, nasopharyngeal cancer, laryngeal cancer, colorectal cancer, breast cancer, prostate cancer, bladder cancer, ovarian cancer, uterine cancer, osteocarcinoma, melanoma, glioblastoma, lymphoma, leukemia, adrenal neuroblastoma, skin cancer, astrocytoma, and the like.

In the present invention, the crystal form A of maleate of the multi-substituted benzene ring compound of formula II can also be used in combination with one or more other active ingredients; when used in combination, the active ingredients can be separate compositions for simultaneous administration or separate administration at different time points via the same or different routes of administration in therapy, or they can be administered together in the same pharmaceutical composition.

In the present invention, administration methods of the pharmaceutical composition are not particularly limited, and formulations in various dosage forms can be selected for administration depending on age, sex, and other conditions and symptoms of a patient. For example, tablets, pills, solutions, suspensions, emulsions, granules or capsules are administered orally; injections can be administered alone or mixed with injection transfusion (such as glucose solution and amino acid solution) for intravenous injection; suppositories are administered rectally.

In some embodiments, the crystal form A of maleate of the multi-substituted benzene ring compound of formula II does not undergo transformation when formulated into a formulation with one or more pharmaceutically acceptable carriers and/or excipients and/or diluents.

In the present invention, room temperature refers to 10-35° C.

In the present invention, water activity $a_w$ of the solvents used is less than 0.2.

In the present invention, "prophylaxis" refers to "prevention". "Preventing" or "prevention" refers to a reduction in the risk of acquiring or developing a disease or disorder (i.e., causing at least one of the clinical symptoms of the disease not to occur in a subject who may be exposed to an agent causing the disease or in a subject susceptible to the disease prior to the onset of the disease).

In the present invention, "treating" or "treatment" refers to ameliorating a disease or disorder (i.e., arresting the disease or reducing the manifestation, extent or severity of clinical symptoms thereof); or improving at least one physical parameter which may not be perceived by the subject; or slowing disease progression.

The crystal forms of the present invention can be identified by one or more solid-state analysis methods, such as X-ray powder diffraction, single crystal X-ray diffraction, infrared absorption spectroscopy, differential scanning calorimetry, thermogravimetric curves, etc. Those skilled in the art will appreciate that the peak intensity and/or peak profile of the X-ray powder diffraction pattern can vary depending on the experimental conditions. Meanwhile, the measured 2θ values will have an error of about ±0.2° due to the different accuracy of the instruments. The relative intensity values of the peaks depend more on certain properties of the measured sample, such as the size and purity of the crystal form, than the positions of the peaks, so the measured peak intensities may have a deviation of about ±20%. Despite experimental errors, instrumental errors, orientation preference, etc., those skilled in the art can obtain sufficient information for identifying each crystal form from the X-ray powder diffraction data provided herein. In the infrared spectrometry, the shape of the spectrum and the positions of the absorption peaks are affected to some extent due to different performances of various models of instruments, differences in the degree of grinding during preparation of the test articles, or different degrees of water absorption, and the like. In the DSC measurement, the initial temperature, maximum temperature of the endothermic peaks and heat of fusion data obtained from the actual measurement have a certain degree of variability depending on the heating rate, crystal shape, purity and other measurement parameters.

The above preferred conditions may be combined arbitrarily to obtain preferred embodiments of the present invention without departing from the general knowledge in the art.

The reagents and raw materials used in the present invention are commercially available.

The positive and progressive effects of the present invention are as follows: the crystal form A of maleate of the multi-substituted benzene ring compound of formula II provided herein has simplicity in preparation, better physical and chemical stability (there is no crystal form transformation and chemical purity decrease after being placed in an open vial at 60° C. for one day and under the conditions of 25° C./60% RH and 40° C./75% RH for one week), better solubility (the solubility in water and SGF reaches 6 mg/mL, and the solubility in FaSSIF and FeSSIF reaches 4 mg/mL), lower hygroscopicity (the vapor sorption is 0.4% at 25° C./80% RH, and almost no hygroscopicity exists), and good fluidity (the angle of repose of a single API is about 40° when D90 is controlled at 200 μm), thereby being of great value for development of the formulation process as a raw material.

DETAILED DESCRIPTION

Figure 1:
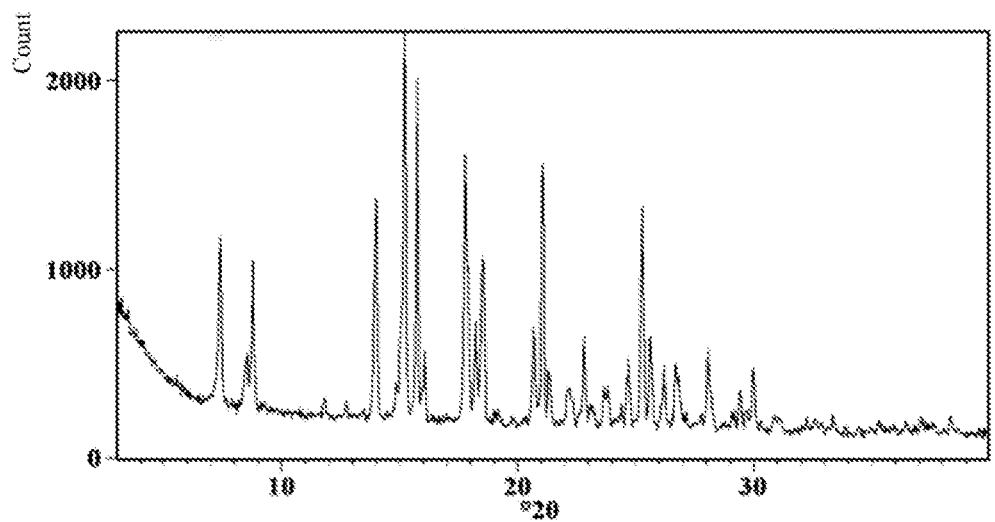
FIG. 1 is an X-ray powder diffraction pattern of a crystal form A of maleate of the multi-substituted benzene ring compound of formula II.

The present invention is further illustrated by the following examples, which are not intended to limit the present invention. Experimental procedures without specified conditions in the following examples were performed in accordance with conventional procedures and conditions, or in accordance with instructions.

The instruments used in the following examples are shown in Table 2:

TABLE 2

| Instrument | Model | Manufacturer |
| --- | --- | --- |
| X-ray powder diffractometer | X' Pert3 | PANalytical B.V. |
| Differential scanning calorimeter | Discovery 2500 | TA Instruments, USA |
| Thermogravimetric analyzer | Discovery 5500 | TA Instruments, USA |
| Dynamic vapor sorption instrument | Intrinsic | Surface Measurement Systems Ltd., UK |
| $^1$H solution nuclear magnetic resonance | Bruker 400M | Bruker |

X-Ray Powder Diffraction (XRPD) Analysis:

The XRPD patterns were acquired on an X' Pert$^3$ ray powder diffraction analyzer (Empyrean and PANalytical), and the scanning parameters are shown in Table 3:

TABLE 3

| Parameter | XRPD (reflection mode) |
| --- | --- |
| Model of instrument | X' Pert$^3$ |
| X-ray | Cu, kα, Kα1 (Å): 1.540598; Kα2 (Å): 1.544426 Intensity ratio Kα2/Kα1: 0.50 |
| X-ray light tube settings | 45 kV, 40 mA |
| Divergent slit | Fixed ⅛° |
| Scanning mode | Continuous |
| Scanning range (°2Theta) | 3-40 |
| Scanning time of each step (s) | 46.7 |
| Scanning step length (°2TH) | 0.0263 |
| Test time | 5 min 04 s |

Thermogravimetric Analysis (TGA) and Differential Scanning Calorimetry (DSC):

The TGA and DSC patterns were acquired on a Discovery 5500 thermogravimetric analyzer and a Discovery 2500 differential scanning calorimeter, respectively, and the parameters are shown in Table 4:

TABLE 4

| Parameter | TGA | DSC |
| --- | --- | --- |
| Method | Linear heating | Linear heating |
| Sample dish | Aluminum dish, open | Aluminum dish, closed |
| Temperature range | Room temperature-350° C. | 25° C.-300° C. |

TABLE 4-continued

| Parameter | TGA | DSC |
| --- | --- | --- |
| Scanning rate (° C./min) | 10 | 50 |
| Protective gas | Nitrogen | Nitrogen |

Dynamic Vapor Sorption (DVS)

Dynamic vapor sorption (DVS) curves were acquired on a DVS Intrinsic in Surface Measurement Systems (SMS). The relative humidity at 25° C. was corrected with the deliquescence points of LiCl, Mg(NO$_3$)$_2$ and KCl. The DVS test parameters are listed in Table 5:

TABLE 5

| Parameter | Set value |
| --- | --- |
| Temperature | 25° C. |
| Sample amount | 10-20 mg |
| Protective gas and flow | N$_2$, 200 mL/min |
| dm/dt | 0.002%/min |
| Minimum dm/dt equilibration time | 10 min |
| Maximum equilibration time | 180 min |
| RH range | 0% RH-95% RH-0% RH |
| RH gradient | 10% |

$^1$H Solution Nuclear Magnetic Resonance ($^1$H Solution NMR)

The $^1$H solution NMR patterns were acquired on a Bruker 400M nuclear magnetic resonance spectrometer using DMSO-d$_6$ as a solvent.

Ultra Performance Liquid Chromatography (UPLC)

The purity and solubility of the samples in the test were tested by Waters ultra performance liquid chromatograph, and the conditions are shown in Table 6:

TABLE 6

| HPLC | Waters ultra performance liquid chromatograph |
| --- | --- |
| Chromatographic column | Xselect CSH C18, 150 × 4.6 mm, 3.5 μm |
| Detection wavelength | 302 nm |
| Injection volume | 5 μL |
| Flow rate | 1.0 mL/min |
| Column temperature | 40° C. |
| Sample temperature | Room temperature |
| Mobile phase | A: H$_2$O (0.1%NH$_3$·H$_2$O) B: Acetonitrile |

| Gradient | Time (min) | % B |
| --- | --- | --- |
| | 0.0 | 25 |
| | 12.0 | 65 |
| | 17.0 | 65 |
| | 22.0 | 85 |
| | 22.1 | 25 |
| | 25.0 | 25 |

| Run time | 25.0 min |
| --- | --- |
| Diluent | ACN:H$_2$O = 1:1 |

Example 1: Preparation of Crystal Form A of Multi-Substituted Benzene Ring Compound of Formula I (See WO2020/020374A1)

To a solution of 3-aminomethyl-4-methyl-6-methylpyridin-2(1H)-one hydrochloride (1 g, 5.3 mmol, 1.05 eq), EDC-HCl (1.2 g, 6.6 mmol, 1.25 eq), HOBt·H$_2$O (0.97 g, 6.6 mmol, 1.25 eq), and 3-(ethyl(tetrahydro-2H-pyran-4-yl) amino)-2-methyl-5-(trans-3(piperidin-1-yl)cyclobutoxy) benzoic acid (2.1 g, 5.0 mmol, 1 eq) in DMF (10 mL) was added DIPEA (1.9 g, 15.1 mmol, 3 eq) at room temperature.

After the reaction was completed, water (80 mL) was added, the mixed solution was filtered, and the filter cake was dried to obtain N-((4,6-dimethyl-2-oxo-1,2-dihydropyridin-3-yl)methyl-3-(ethyl(tetrahydro-2H-pyran-4-yl)amino)-2-methyl-5-(trans-3(piperidin-1-yl)cyclobutoxy)benzamide (1.7 g). m/z (ES+), [M+H]$^+$=551.40; HPLC tR=6.901 min. $^1$H NMR (400 MHz, DMSO-d6): δ 11.45 (s, 1H), 8.02 (t, J=4.8 Hz, 1H), 6.59 (d, J=1.9 Hz, 1H), 6.38 (d, J=2.0 Hz, 1H), 5.85 (s, 1H), 4.70-4.63 (m, 1H), 4.25 (d, J=4.0 Hz, 2H), 3.83 (d, J=12 Hz, 2H), 3.24 (d, J=8 Hz, 2H), 3.00-2.85 (m, 3H), 2.32-2.23 (m, 10H), 2.10 (d, J=8 Hz, 8H), 1.6-1.59 (m, 2H), 1.50 (m, 6H), 1.38 (s, 2H), 0.78 (t, J=8.0 Hz, 1H).

Figure 5:
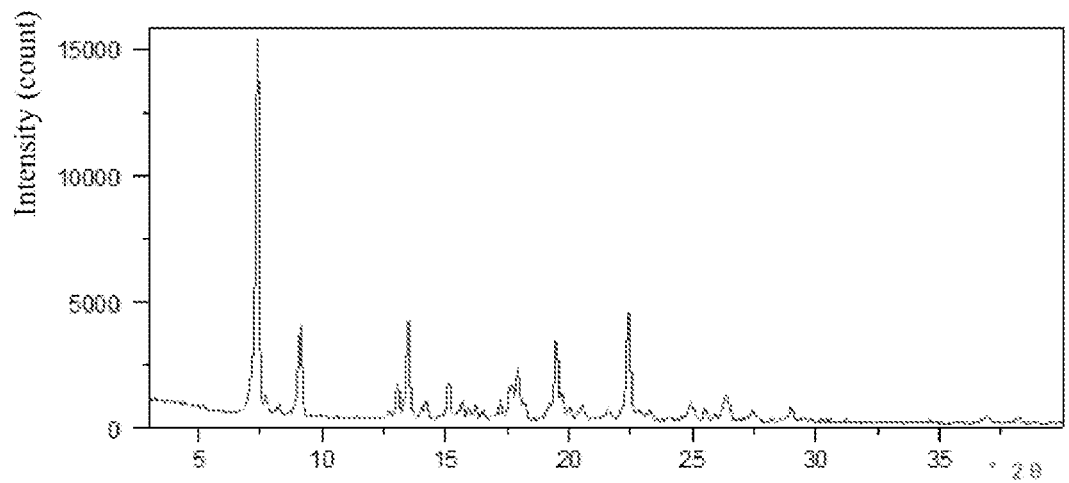
FIG. 5 is an X-ray powder diffraction pattern of a free crystal form A of a multi-substituted benzene ring compound of formula I.
Figure 6:
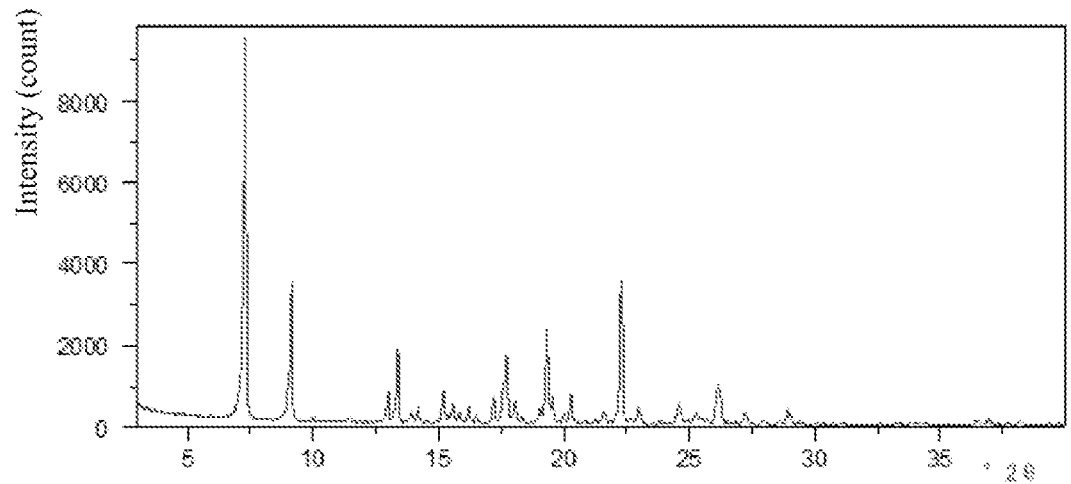
FIG. 6 is an X-ray powder diffraction pattern of a free crystal form B of the multi-substituted benzene ring compound of formula I.

The obtained sample was determined to be a free crystal form A of the multi-substituted benzene ring compound of formula I by X-ray powder diffraction, with an X-ray powder diffraction pattern shown in FIG. 5.

Example 2: Preparation of Crystal Form A of Maleate of Multi-Substituted Benzene Ring Compound of Formula II 397.4 mg of the crystal form A of the multi-substituted benzene ring compound of formula I obtained in Example 1 was weighed into a 20-mL glass vial, maleic acid (87.5 mg) was added, and ethyl acetate (7.0 mL) was added to form a suspension, the suspension was magnetically stirred at room temperature for about 3 days, and the resulting solid was filtered out under vacuum and dried in vacuum at room temperature overnight to obtain a solid sample (443.8 mg).

The obtained sample was determined to be a crystal form A of maleate of the multi-substituted benzene ring compound of formula II by X-ray powder diffraction. The diffraction peaks, relative intensity, interplanar spacing, peak height and left full width at half maximum (FWHM Left) of the X-ray powder diffraction pattern expressed in terms of 2θ angles can also be shown in Table 7, and the X-ray powder diffraction pattern is shown in FIG. 1.

TABLE 7

| Diffraction peak number | 2θ angle (°) | Relative intensity (%) | d(A) | Peak height (cts) | FWHM Left [°2θ] |
| --- | --- | --- | --- | --- | --- |
| 1 | 7.39 | 42.64 | 11.96 | 874.60 | 0.1023 |
| 2 | 8.51 | 12.59 | 10.39 | 258.19 | 0.1279 |
| 3 | 8.78 | 37.91 | 10.08 | 777.54 | 0.0768 |
| 4 | 11.79 | 4.22 | 7.51 | 86.66 | 0.0768 |
| 5 | 12.73 | 3.84 | 6.95 | 78.75 | 0.0768 |
| 6 | 13.99 | 56.77 | 6.33 | 1164.38 | 0.1279 |
| 7 | 15.21 | 100.00 | 5.83 | 2051.22 | 0.1023 |
| 8 | 15.73 | 88.27 | 5.63 | 1810.70 | 0.1023 |
| 9 | 16.06 | 17.68 | 5.52 | 362.71 | 0.0768 |
| 10 | 17.75 | 67.49 | 5.00 | 1384.39 | 0.1023 |
| 11 | 17.91 | 32.21 | 4.95 | 660.71 | 0.0512 |
| 12 | 18.20 | 25.80 | 4.88 | 529.20 | 0.1023 |
| 13 | 18.51 | 42.40 | 4.79 | 869.71 | 0.1535 |
| 14 | 19.13 | 1.87 | 4.64 | 38.29 | 0.2047 |
| 15 | 19.80 | 1.17 | 4.48 | 24.10 | 0.1535 |
| 16 | 20.68 | 24.70 | 4.29 | 506.60 | 0.1279 |
| 17 | 21.06 | 66.84 | 4.22 | 1371.13 | 0.1023 |
| 18 | 21.32 | 13.09 | 4.17 | 268.57 | 0.1023 |
| 19 | 22.11 | 9.65 | 4.02 | 197.99 | 0.1535 |
| 20 | 22.81 | 22.28 | 3.90 | 456.96 | 0.1023 |
| 21 | 23.07 | 5.24 | 3.86 | 107.47 | 0.1535 |
| 22 | 23.66 | 9.98 | 3.76 | 204.75 | 0.0768 |
| 23 | 23.84 | 8.90 | 3.73 | 182.56 | 0.1023 |
| 24 | 24.41 | 5.27 | 3.65 | 108.03 | 0.0768 |
| 25 | 24.68 | 12.31 | 3.61 | 252.44 | 0.1535 |
| 26 | 25.28 | 57.69 | 3.52 | 1183.41 | 0.1279 |
| 27 | 25.62 | 23.51 | 3.48 | 482.25 | 0.1279 |
| 28 | 26.23 | 10.60 | 3.40 | 217.40 | 0.1023 |
| 29 | 26.68 | 16.79 | 3.34 | 344.30 | 0.1023 |

TABLE 7-continued

| Diffraction peak number | 2θ angle (°) | Relative intensity (%) | d(A) | Peak height (cts) | FWHM Left [°2θ] |
| --- | --- | --- | --- | --- | --- |
| 30 | 26.84 | 12.91 | 3.32 | 264.74 | 0.1023 |
| 31 | 28.06 | 20.35 | 3.18 | 417.33 | 0.0768 |
| 32 | 29.11 | 3.72 | 3.07 | 76.27 | 0.1023 |
| 33 | 29.41 | 10.37 | 3.04 | 212.76 | 0.1279 |
| 34 | 29.67 | 5.16 | 3.01 | 105.94 | 0.1023 |
| 35 | 29.99 | 16.33 | 2.98 | 334.96 | 0.0768 |
| 36 | 30.86 | 3.90 | 2.90 | 79.96 | 0.1279 |
| 37 | 32.44 | 1.66 | 2.76 | 34.05 | 0.6140 |
| 38 | 33.38 | 4.28 | 2.68 | 87.81 | 0.0768 |
| 39 | 34.46 | 1.45 | 2.60 | 29.72 | 0.1535 |
| 40 | 35.33 | 2.75 | 2.54 | 56.49 | 0.1535 |
| 41 | 36.50 | 2.36 | 2.46 | 48.41 | 0.1535 |
| 42 | 37.08 | 4.26 | 2.42 | 87.29 | 0.0768 |
| 43 | 38.33 | 4.65 | 2.35 | 95.32 | 0.1023 |

Figure 2:
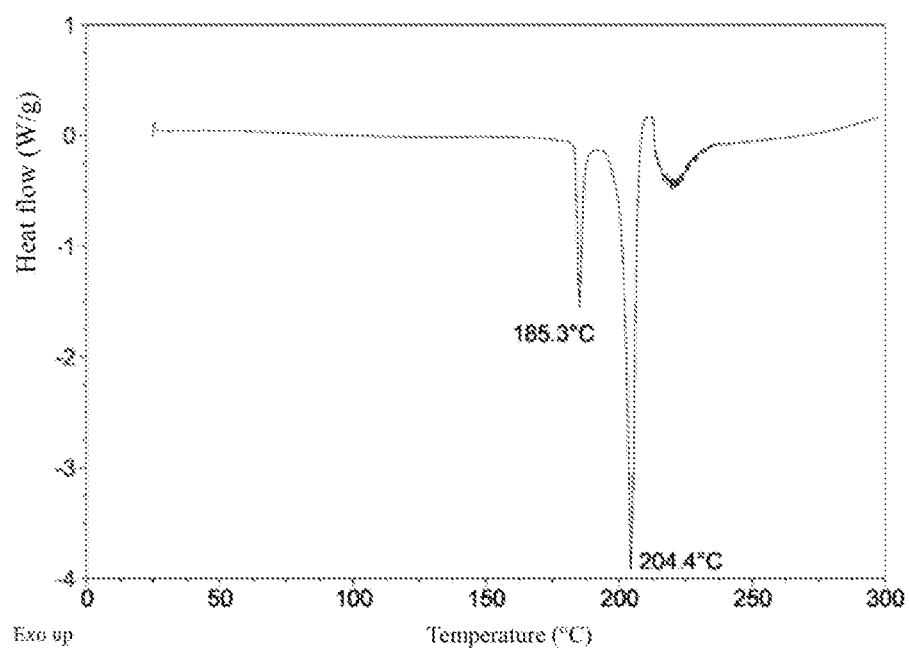
FIG. 2 is a differential scanning calorimetry (DSC) pattern of the crystal form A of maleate of the multi-substituted benzene ring compound of formula II.

In FIG. 2, the DSC pattern shows that endothermic signals were observed at 185.3° C. and 204.4° C. for the crystal form A of maleate of the multi-substituted benzene ring compound of formula II.

Figure 3:
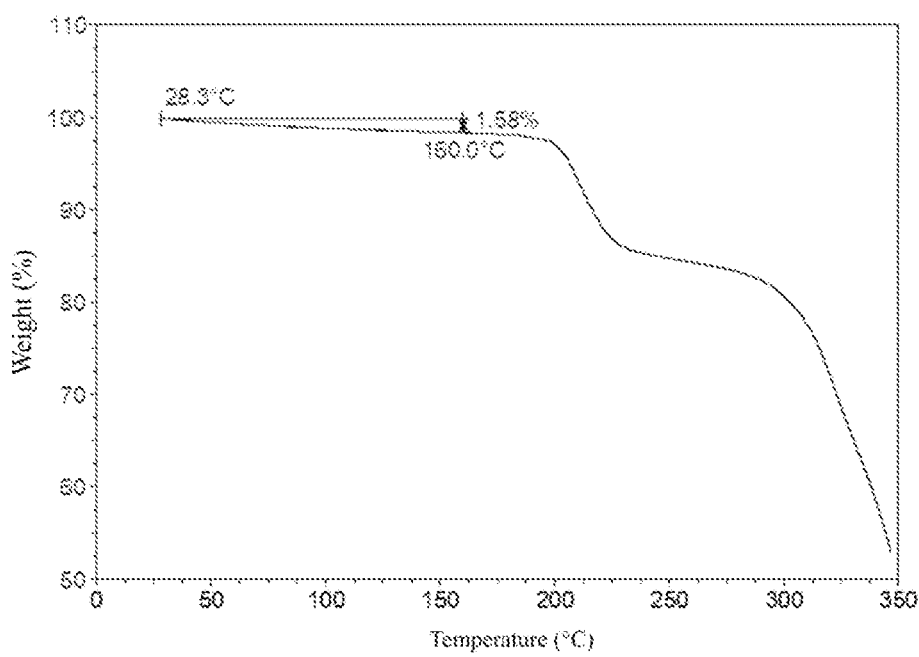
FIG. 3 is a thermogravimetric analysis (TGA) pattern of the crystal form A of maleate of the multi-substituted benzene ring compound of formula II.

In FIG. 3, the TGA pattern shows that the crystal form A of maleate of the multi-substituted benzene ring compound of formula II had a weight loss of 1.58% at 160° C.

$^1$H NMR data of the crystal form A of maleate of the multi-substituted benzene ring compound of formula II are as follows: $^1$H NMR (400 MHz, DMSO-d6): δ 11.45 (s, 1H), 9.22 (brs, 1H), 8.03 (t, J=4.8 Hz, 1H), 6.62 (d, J=2.4 Hz, 1H), 6.42 (d, J=2.4 Hz, 1H), 6.02 (s, 2H), 5.86 (s, 1H), 4.80 (t, J=6.4 Hz, 1H), 4.25 (d, J=4.8 Hz, 2H), 3.83 (d, J=11.2 Hz, 3H), 3.32-3.20 (m, 4H), 2.99 (dd, J=6.8, 14.0 Hz, 2H), 2.97-2.92 (m, 1H), 2.70-2.67 (m, 4H), 2.40-2.38 (m, 2H), 2.20 (s, 3H), 2.11 (s, 3H), 2.10 (s, 1H), 1.81-1.46 (m, 10H), 0.79 (t, J=6.8 Hz, 3H) ppm.

The results show that in the crystal form A of maleate of the multi-substituted benzene ring compound of formula II, the molar ratio of the multi-substituted benzene ring compound of formula I to maleic acid was 1:1, the molar ratio of the free crystal form of the multi-substituted benzene ring compound of formula I to ethyl acetate was 1:0.08, and the mass fraction of ethyl acetate residue was about 1.0%.

Example 3: Preparation of Crystal Form A of Maleate of Multi-Substituted Benzene Ring Compound of Formula II Compared with Example 2, the difference was only in the type of the solvent. The ethyl acetate in Example 2 was separately replaced by methyl isobutyl ketone and 2-methyltetrahydrofuran.

The X-ray powder diffraction patterns of the samples obtained by this method were compared with that of the sample in Example 2, and the obtained samples were all determined to be the crystal form A of maleate of the multi-substituted benzene ring compound of formula II.

Example 4: Preparation of Crystal Form B of Maleate of Multi-Substituted Benzene Ring Compound of Formula II The crystal form A of the multi-substituted benzene ring compound of formula I (19.89 g) was added into a reactor, and absolute ethanol (137.4 g) was added. The mixture was stirred and heated to 75° C., and the internal temperature was controlled at 75° C. Maleic acid (4.0 g) was added into the reactor through an addition funnel, and the mixture was stirred until it was clarified. The internal temperature of the reactor was reduced to 20° C., and the mixture was stirred until a large amount of solid was precipitated, then the internal temperature of the reactor was controlled at 20° C., and methyl tert-butyl ether (257.8 g) was added. After addition, the mixture was stirred for 0.5-3 h, and then put into a filter press, the mother liquor was well drained, then the filter cake was washed with methyl tert-butyl ether (60.1 g), and well drained to obtain a solid wet product, and the product was dried to obtain a solid sample (21.16 g).

Figure 4:
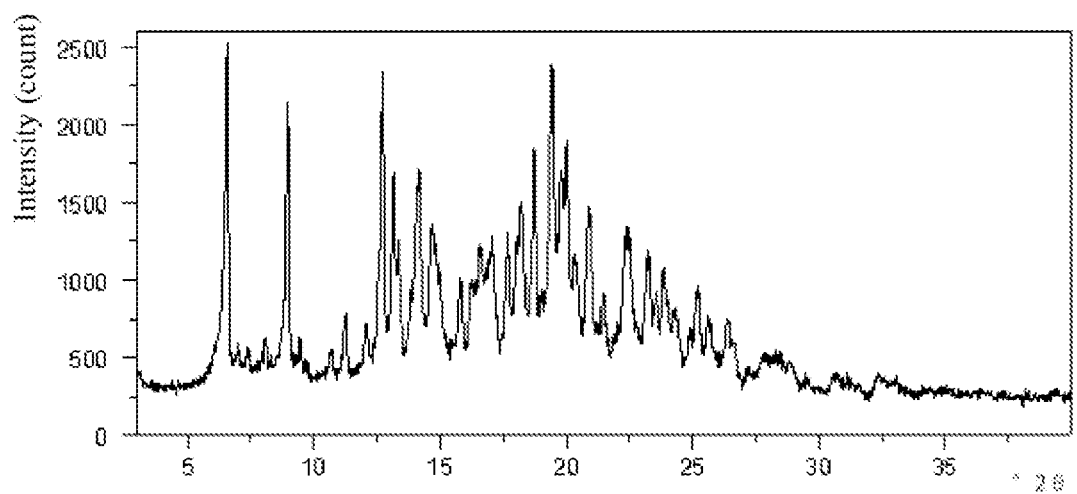
FIG. 4 is an X-ray powder diffraction pattern of a crystal form B of maleate of the multi-substituted benzene ring compound of formula II.

The obtained sample was determined to be a crystal form B of maleate of the multi-substituted benzene ring compound of formula II by X-ray powder diffraction. The X-ray powder diffraction pattern expressed in terms of 2θ angles is shown in FIG. 4.

Example 5: Preparation of Crystal Form A of Maleate of Multi-Substituted Benzene Ring Compound of Formula II 20 mg of the crystal form B of maleate of the multi-substituted benzene ring compound of formula II obtained in Example 4 was weighed into an HPLC vial, and isopropanol (0.5 mL) was added. The resulting suspension was magnetically stirred at 50° C. (~1000 rpm), and after 6 days, the mixture was separated by centrifugation to obtain a sample.

The X-ray powder diffraction pattern of the sample obtained by this method was compared with that of the sample in Example 2, and the obtained sample was determined to be the crystal form A of maleate of the multi-substituted benzene ring compound of formula II.

Example 6: Preparation of Crystal Form A of Maleate of Multi-Substituted Benzene Ring Compound of Formula II Compared with Example 5, the difference was only in the type of the solvent. The isopropanol in Example 5 was separately replaced by isopropanol/water ($a_w$=0.2), butanone, isopropyl acetate, anisole, acetonitrile, dichloromethane/cyclopentyl methyl ether (v:v=1:4), toluene, methyl isobutyl ketone, tetrahydrofuran, 1,4-dioxane, acetone, ethanol, methyl isobutyl ketone/isopropyl acetate (v:v=1:1), isopropanol/methyl tert-butyl ether (v:v=1:1), oracetonitrile/toluene (v:v=1:1).

The X-ray powder diffraction patterns of the samples obtained by this method were compared with that of the sample in Example 2, and the obtained samples were all determined to be the crystal form A of maleate of the multi-substituted benzene ring compound of formula II.

Example 7: Preparation of Crystal Form A of Maleate of Multi-Substituted Benzene Ring Compound of Formula II Compared with Example 5, the difference was only in temperature. The temperature of 50° C. in Example 5 was replaced by a temperature cycle, i.e. 50° C. to 5° C., 0.1° C./min, and 3 cycles.

The X-ray powder diffraction pattern of the sample obtained by this method was compared with that of the sample in Example 2, and the obtained sample was determined to be the crystal form A of maleate of the multi-substituted benzene ring compound of formula II.

Example 8: Preparation of Crystal Form A of Maleate of Multi-Substituted Benzene Ring Compound of Formula II Compared with Example 5, the differences were in temperature and reaction time. The temperature of 50° C. in Example 5 was replaced by room temperature, and the reaction time of 6 days was replaced by 30 days.

The X-ray powder diffraction pattern of the sample obtained by this method was compared with that of the sample in Example 2, and the obtained sample was determined to be the crystal form A of maleate of the multi-substituted benzene ring compound of formula II.

Example 9: Preparation of Crystal Form A of Maleate of Multi-Substituted Benzene Ring Compound of Formula II 20 mg of the crystal form B of maleate of the multi-substituted benzene ring compound of formula II obtained in Example 4 was weighed into a 3-mL vial, a mixed solution of dimethyl sulfoxide and ethyl acetate (v:v=1:3, 0.5 mL) was added, and the mixture was stirred at 50° C. for about 2 h, and filtered (through a PTFE filter membrane with a pore size of 0.45 m). The resulting filtrate was collected and placed in a biochemical incubator, and cooled from 50° C. to 5° C. at a cooling rate of 0.1° C./min. The sample was transferred to room temperature for volatilization, the solid was precipitated, and the mixture was filtered to obtain a sample.

The X-ray powder diffraction pattern of the sample obtained by this method was compared with that of the sample in Example 2, and the obtained sample was determined to be the crystal form A of maleate of the multi-substituted benzene ring compound of formula II.

Example 10: Preparation of Crystal Form A of Maleate of Multi-Substituted Benzene Ring Compound of Formula II The crystal form B of maleate of the multi-substituted benzene ring compound of formula II obtained in Example 4 was weighed and used to prepare nearly saturated stock solutions with good solvents in Table 8, respectively. To 20-mL vials were added the stock solutions (1 mL), and the corresponding anti-solvents in Table 8 were added with magnetic stirring. The anti-solvents were added dropwise with stirring until a solid was precipitated. In Table 8, "*" indicates that there was still no solid after addition of about 9 mL of the anti-solvent, and the mixture was transferred to 5° C. to obtain a solid. The specific good solvents and anti-solvents are shown in Table 8:

TABLE 8

| Good solvent | Anti-solvent |
| --- | --- |
| MeOH | EtOAc* |
| DMSO | IPAc* |
| CHCl$_3$ | ACN* |
|  | MEK* |
|  | EtOAc |

The X-ray powder diffraction patterns of the samples obtained by this method were compared with that of the sample in Example 2, and the obtained samples were all determined to be the crystal form A of maleate of the multi-substituted benzene ring compound of formula II.

Example 11: Preparation of Crystal Form A of Maleate of Multi-Substituted Benzene Ring Compound of Formula II The crystal form B of maleate of the multi-substituted benzene ring compound of formula II obtained in Example 4 was weighted and used to prepare a nearly saturated stock solution with a good solvent methanol. The stock solution (0.5 mL) was added into a 3-mL vial, and an anti-solvent acetone (about 4 mL) was added into another 20-mL vial. The 3-mL vial was open and placed in the 20-mL vial, and the 20-mL vial was sealed and left to stand at room temperature. When solid precipitation was observed, the solid was collected and subjected to the XRPD test.

The X-ray powder diffraction pattern of the sample obtained by this method was compared with that of the sample in Example 2, and the obtained sample was determined to be the crystal form A of maleate of the multi-substituted benzene ring compound of formula II.

Example 12: Preparation of Crystal Form A of Maleate of Multi-Substituted Benzene Ring Compound of Formula II Compared with Example 11, the difference was only in the type of the anti-solvent. The anti-solvent acetone in Example 11 was replaced by ethyl acetate or tetrahydrofuran.

The X-ray powder diffraction pattern of the sample obtained by this method was compared with that of the sample in Example 2, and the obtained sample was determined to be the crystal form A of maleate of the multi-substituted benzene ring compound of formula II.

Comparative Example 1

Compared with Example 5, the difference was only in the type of the solvent. The isopropanol in Example 5 was separately replaced by the solvents shown in Table 9, where "*" indicates that the mixture was stirred until it was clarified, and then transferred to room temperature for volatilization to obtain a solid.

TABLE 9

| No. | Solvent (v:v) | Result |
|---|---|---|
| 1 | IPA/$H_2O$($a_w$ = 0.4) | Crystal form C of maleate * |
| 2 | IPA/$H_2O$($a_w$ = 0.6) | Crystal form C of maleate * |
| 3 | IPA/$H_2O$($a_w$ = 0.8) | Crystal form C of maleate * |
| 4 | $H_2O$ | Crystal form C of maleate |

Figure 7:
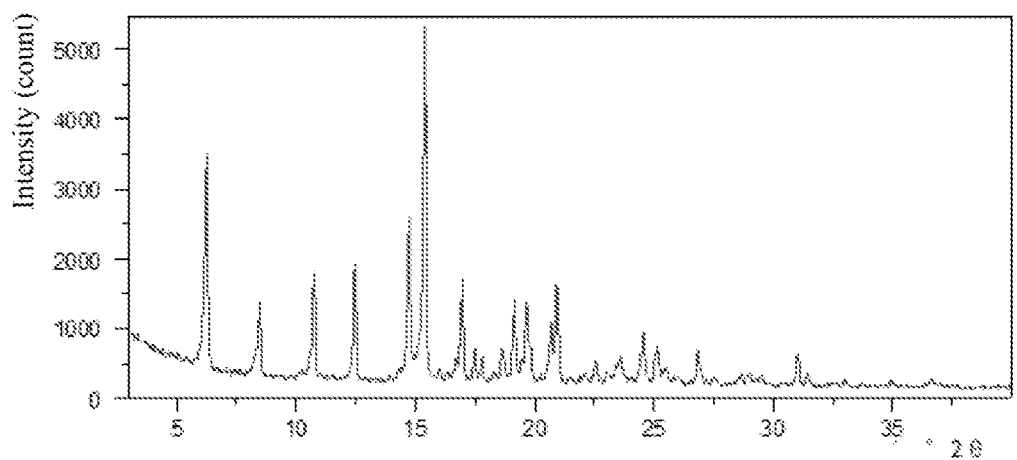
FIG. 7 is an X-ray powder diffraction pattern of a crystal form C of maleate of the multi-substituted benzene ring compound of formula II.

The obtained samples (Nos. 1-4) were all determined to be a crystal form C of maleate of the multi-substituted benzene ring compound of formula II by X-ray powder diffraction. The X-ray powder diffraction pattern is shown in FIG. 7.

Comparative Example 2

Compared with Example 7, the difference was only in the type of the solvent. The solvent in Example 7 was replaced by water.

The X-ray powder diffraction pattern of the sample obtained by this method was compared with that of the sample in Comparative Example 1, and the obtained sample was determined to be the crystal form C of maleate of the multi-substituted benzene ring compound of formula II.

Comparative Example 3

Compared with Example 8, the difference was only in the type of the solvent. The solvent in Example 8 was separately replaced by the solvents shown in the following table, where "*" indicates that the mixture was volatilized at room temperature to obtain a solid, and the results are shown in Table 10:

TABLE 10

| No. | Solvent (v:v) | Result |
|---|---|---|
| 1 | Acetone/$H_2O$($a_w$ = 0.4) | Crystal form C of maleate |
| 2 | Acetone/$H_2O$($a_w$ = 0.6) | Crystal form C of maleate |
| 3 | Acetone/$H_2O$($a_w$ = 0.8) | Crystal form C of maleate * |
| 4 | $H_2O$ | Crystal form C of maleate |
| 5 | $CHCl_3$/n-Heptane(1:4) | Crystal form B of maleate |

The obtained sample (No. 5) was determined to be the crystal form B of maleate of the multi-substituted benzene ring compound of formula II by X-ray powder diffraction. The X-ray powder diffraction patterns of the obtained samples (Nos. 1-4) were compared with that of the sample in Comparative Example 1, and the obtained samples were all determined to be the crystal form C of maleate of the multi-substituted benzene ring compound of formula II.

Comparative Example 4

Compared with Example 9, the difference was only in the type of the solvent. The solvent (a mixed solution of dimethyl sulfoxide and ethyl acetate (v:v=1:3)) in Example 9 was separately replaced by the solvents shown in Table 11, where "*" indicates that the solid was precipitated directly after cooling to 5° C. The results are shown in Table 11:

TABLE 11

| No. | Solvent (v:v) | Result |
|---|---|---|
| 1 | MeOH/$H_2O$ | Crystal form C of maleate * |
| 2 | EtOH/ACN | Crystal form C of maleate |
| 3 | NMP/THF(1:3) | Crystal form C of maleate |
| 4 | $CHCl_3$/Acetone(1:2) | Crystal form C of maleate * |

The X-ray powder diffraction patterns of the obtained samples (Nos. 1-4) were compared with that of the sample in Comparative Example 1, and the obtained samples were all determined to be the crystal form C of maleate of the multi-substituted benzene ring compound of formula II.

Comparative Example 5

Compared with Example 10, the difference was only in the type of the solvent. The good solvents and the anti-solvents in Example 10 were replaced by the solvents shown in Table 12, respectively, where ** indicates that the mixture was transferred to 5° C. for clarification, and then transferred to room temperature for volatilization to obtain a solid; #indicates that the mixture was clarified at 5° C., and then transferred to 50° C. and dried in vacuum to obtain a solid due to the high boiling point of the solvent. The specific results are shown in Table 12:

TABLE 12

| No. | Good solvent | Anti-solvent | Result |
|---|---|---|---|
| 1 | MeOH | Acetone | Crystal form C of maleate ** |
| 2 |  | $H_2O$ | Crystal form C of maleate ** |
| 3 |  | MTBE | Crystal form C of maleate |
| 4 |  | THF | Crystal form C of maleate ** |
| 5 |  | ACN | Crystal form C of maleate ** |
| 6 |  | Toluene | Crystal form C of maleate ** |

TABLE 12-continued

| No. | Good solvent | Anti-solvent | Result |
| --- | --- | --- | --- |
| 7 | DMSO | MIBK | Crystal form C of maleate # |
| 8 | | IPA | Crystal form C of maleate # |
| 9 | | MTBE | Crystal form C of maleate # |
| 10 | | 2-MeTHF | Crystal form C of maleate # |
| 11 | CHCl$_3$ | IPA | Crystal form C of maleate ** |
| 12 | | n-Heptane | Crystal form B of maleate |

The X-ray powder diffraction patterns of the obtained samples (Nos. 1-11) were compared with that of the sample in Comparative Example 1, and the obtained samples were determined to be the crystal form C of maleate of the multi-substituted benzene ring compound of formula II; the X-ray powder diffraction pattern of the obtained sample (No. 12) was compared with that of the sample (No. 5) in Comparative Example 3, and the obtained sample was determined to be the crystal form B of maleate of the multi-substituted benzene ring compound of formula II.

Comparative Example 6

Compared with Example 11, the difference was only in the type of the solvent. The good solvents and the anti-solvents in Example 11 were replaced by the solvents shown in Table 13, respectively, where * indicates that the mixture was transferred to 50° C. and dried in vacuum to obtain a solid due to the high boiling point of the solvent. The obtained results are shown in Table 13:

TABLE 13

| No. | Good solvent | Anti-solvent | Result |
| --- | --- | --- | --- |
| 1 | MeOH | MTBE | Crystal form C of maleate |
| 2 | DMSO | IPA | Crystal form C of maleate * |
| 3 | | MEK | Crystal form C of maleate * |
| 4 | | IPAc | Crystal form C of maleate * |
| 5 | | ACN | Crystal form C of maleate * |
| 6 | | 2-MeTHF | Crystal form C of maleate * |

The X-ray powder diffraction patterns of the obtained samples (Nos. 1-6) were compared with that of the sample in Comparative Example 1, and the obtained samples were all determined to be the crystal form C of maleate of the multi-substituted benzene ring compound of formula II.

Comparative Example 7

The crystal form B of maleate of the multi-substituted benzene ring compound of formula II obtained in Example 4 was weighted into a 3-mL vial, and the solvent (about 4 mL) shown in the following table was added into another 20-mL vial. The 3-mL vial was open and placed in the 20-mL vial, and the 20-mL vial was sealed. The mixture was left to stand at room temperature for 30 days and subjected to the XRPD test. The results are shown in Table 14:

TABLE 14

| No. | Solvent | Result |
| --- | --- | --- |
| 1 | H$_2$O | Crystal form C of maleate |
| 2 | DCM | Crystal form D of maleate |
| 3 | EtOH | Crystal form B of maleate |
| 4 | THF | Crystal form B of maleate |

TABLE 14-continued

| No. | Solvent | Result |
| --- | --- | --- |
| 5 | IPAc | Crystal form B of maleate |
| 6 | EtOAc | Crystal form B of maleate |

Figure 8:
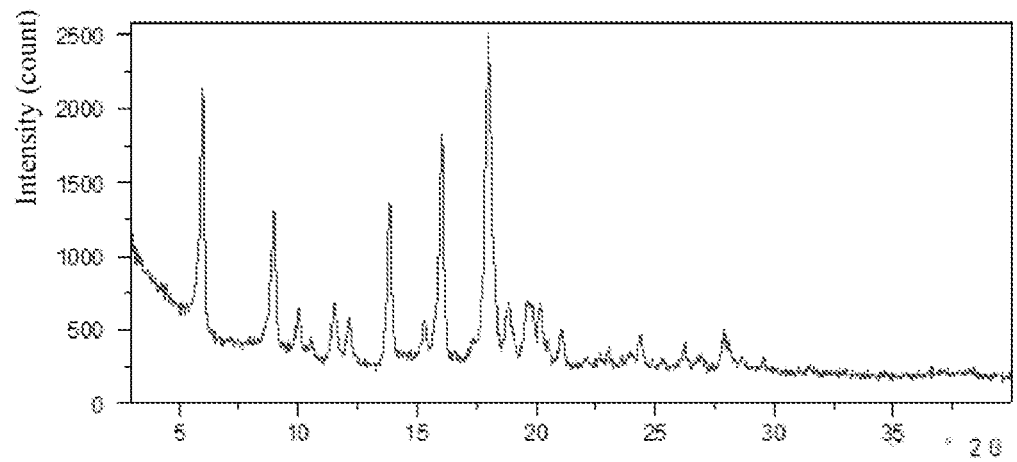
FIG. 8 is an X-ray powder diffraction pattern of a crystal form D of maleate of the multi-substituted benzene ring compound of formula II.

The X-ray powder diffraction pattern of the obtained sample (No. 1) was compared with that of the sample in Comparative Example 1, and the obtained sample was determined to be the crystal form C of maleate of the multi-substituted benzene ring compound of formula II; the obtained sample (No. 2) was determined to be a crystal form D of maleate of the multi-substituted benzene ring compound of formula II by X-ray powder diffraction, and the X-ray powder diffraction pattern is shown in FIG. 8; the X-ray powder diffraction patterns of the obtained samples (Nos. 3-6) were compared with that of the sample (No. 5) in Comparative Example 3, and the obtained samples were all determined to be the crystal form B of maleate of the multi-substituted benzene ring compound of formula II.

Comparative Example 8

About 20 mg of the crystal form B of maleate of the multi-substituted benzene ring compound of formula II obtained in Example 4 was weighted into a 3-mL vial, and a saturated salt solution (about 4 mL, 40-90% RH) was added into another 20-mL vial. The 3-mL vial was open and placed in the 20-mL vial, and the 20-mL vial was sealed. The mixture was left to stand at room temperature for 30 days and subjected to the XRPD test. The results are shown in Table 15:

TABLE 15

| No. | Solvent | Result |
| --- | --- | --- |
| 1 | Saturated K$_2$CO$_3$ solution (~40% RH) | Crystal form B of maleate |
| 2 | Saturated Mg(NO$_3$)$_2$ solution (~50% RH) | Crystal form B of maleate |
| 3 | Saturated NaCl solution (~70% RH) | Crystal form C of maleate |
| 4 | Saturated KNO$_3$ solution (~90% RH) | Crystal form C of maleate |

The X-ray powder diffraction patterns of the obtained samples (Nos. 1-2) were compared with that of the sample (No. 5) in Comparative Example 3, and the obtained samples were determined to be the crystal form B of maleate of the multi-substituted benzene ring compound of formula II; the X-ray powder diffraction patterns of the obtained samples (Nos. 3-4) were compared with that of the sample in Comparative Example 1, and the obtained samples were determined to be the crystal form C of maleate of the multi-substituted benzene ring compound of formula II.

Comparative Example 9

20 mg of the crystal form B of maleate of the multi-substituted benzene ring compound of formula II obtained in Example 3 was weighted into a 3-mL glass vial, the solvents (1.0-2.0 mL) shown in the following table were added for dissolving, respectively, the mixture was filtered (through a PTFE filter membrane with a pore size of 0.45 m), and then the filtrate was collected. The vial containing the clear solution was sealed with a sealing film on which several small holes were made, and the mixture was placed at room temperature for slow volatilization. When a solid was precipitated, the resulting solid was collected and subjected to the XRPD test. The results are shown in Table 16.

TABLE 16

| No. | Solvent (v:v) | Result |
|---|---|---|
| 1 | CHCl₃/THF (2:1) | Crystal form B of maleate |
| 2 | MeOH | Crystal form C of maleate |
| 3 | MeOH/EtOAc (2:1) | Crystal form C of maleate |
| 4 | EtOH/H₂O (4:1) | Crystal form C of maleate |
| 5 | MeOH/ACN (2:1) | Crystal form C of maleate |
| 6 | DCM/Acetone (2:1) | Crystal form D of maleate |
| 7 | CHCl₃ | Crystal form D of maleate |
| 8 | DCM | Crystal form D of maleate |

The X-ray powder diffraction pattern of the obtained sample (No. 1) was compared with that of the sample (No. 5) in Comparative Example 3, and the obtained sample was determined to be the crystal form B of maleate of the multi-substituted benzene ring compound of formula II; the X-ray powder diffraction patterns of the obtained samples (Nos. 2-5) were compared with that of the sample in Comparative Example 1, and the obtained samples were all determined to be the crystal form C of maleate of the multi-substituted benzene ring compound of formula II; the X-ray powder diffraction patterns of the obtained samples (Nos. 6-8) were compared with that of the sample (No. 2) in Comparative Example 7, and the obtained samples were all determined to be the crystal form D of maleate of the multi-substituted benzene ring compound of formula II.

Comparative Example 10

Figure 9:
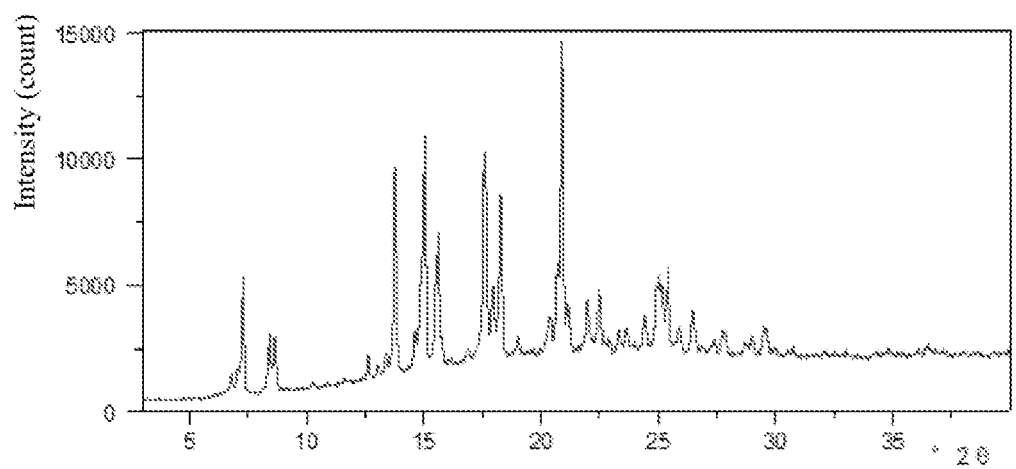
FIG. 9 is an X-ray powder diffraction pattern of a crystal form E of maleate of the multi-substituted benzene ring compound of formula II.

The crystal form A of maleate of the multi-substituted benzene ring compound of formula II obtained in Example 2 was heated to 187° C. under $N_2$ atmosphere. The obtained sample was determined to be a crystal form E of maleate of the multi-substituted benzene ring compound of formula II by X-ray powder diffraction. The X-ray powder diffraction pattern is shown in FIG. 9.

Comparative Example 11: Preparation of Crystal Form A of Succinate of Multi-Substituted Benzene Ring Compound of Formula III

Figure 10:
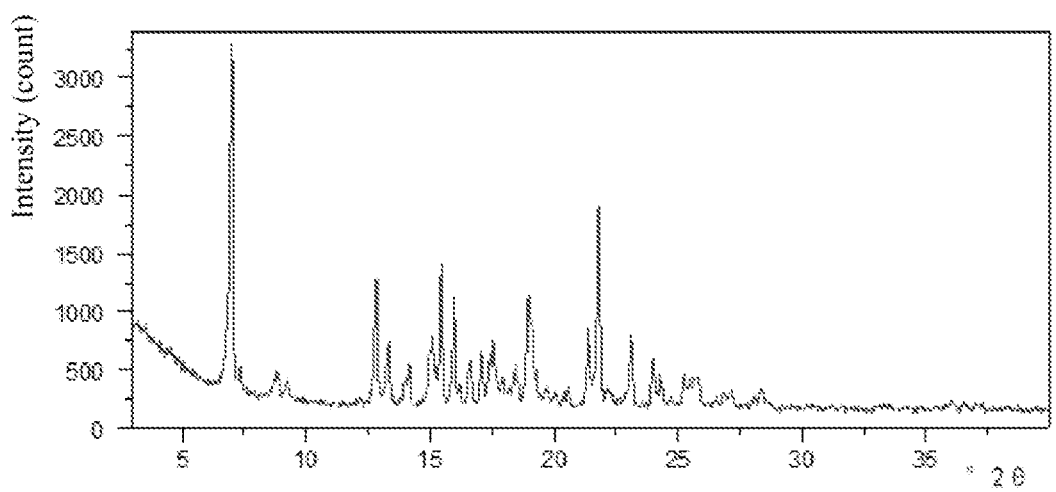
FIG. 10 is an X-ray powder diffraction pattern of a crystal form A of succinate of the multi-substituted benzene ring compound of formula III.

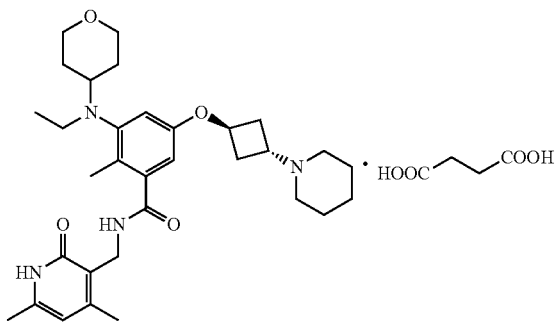

formula III 395.8 mg of the crystal form A of the multi-substituted benzene ring compound of formula I obtained in Example 1 was weighed into a 20-mL glass vial, succinic acid (88.0 mg) was added, and ethyl acetate (7.0 mL) was added to form a suspension, the suspension was magnetically stirred at room temperature for about 3 days, and the resulting solid was filtered out under vacuum and dried in vacuum at room temperature overnight to obtain a solid (418.9 mg). The obtained sample was determined to be a crystal form A of succinate of the multi-substituted benzene ring compound of formula III by X-ray powder diffraction, the X-ray powder diffraction pattern is shown in FIG. 10, and $^1$H NMR data are as follows: $^1$H NMR (400 MHz, DMSO-d6): δ 11.51 (s, 1H), 8.10 (t, J=5.2 Hz, 1H), 6.65 (d, J=2.4 Hz, 1H), 6.44 (d, J=2.4 Hz, 1H), 5.89 (s, 1H), 4.89-4.84 (m, 1H), 4.27 (d, J=5.2 Hz, 2H), 3.85 (d, J=10.4 Hz, 2H), 3.33 (t, J=10.8 Hz, 2H), 3.01 (dd, J=6.8, 13.6 Hz, 2H), 2.93-2.89 (m, 1H), 2.85-2.76 (m, 1H), 2.42 (s, 4H) 2.42-2.35 (m, 4H), 2.22 (s, 3H), 2.13 (d, J=4.0, 6H), 1.63-1.46 (m, 10H), 0.81 (t, J=7.2 Hz, 3H) ppm.

Comparative Example 12: Preparation of Crystal Form A of Hydrobromide of Multi-Substituted Benzene Ring Compound of Formula IV

Figure 11:
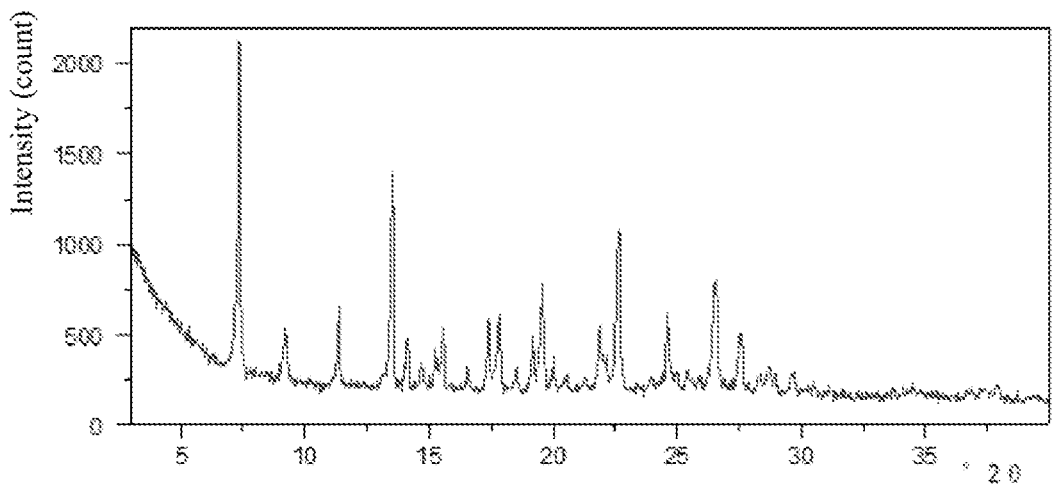
FIG. 11 is an X-ray powder diffraction pattern of a crystal form A of hydrobromide of the multi-substituted benzene ring compound of formula IV.

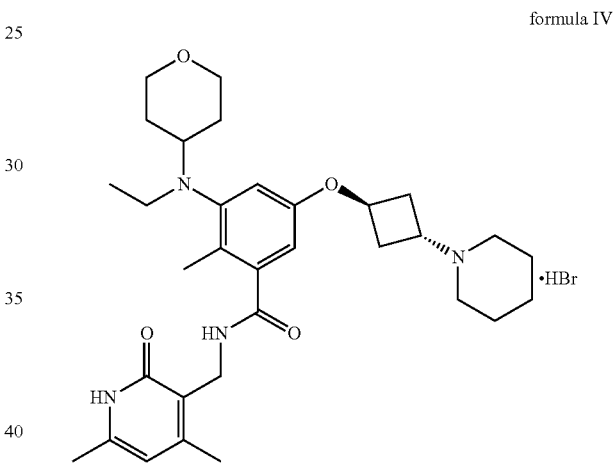

formula IV 400.7 mg of the crystal form A of the multi-substituted benzene ring compound of formula I obtained in Example 1 was weighed into a 20-mL glass vial, and mixed with ethyl acetate (3.5 mL); 156.7 mg of hydrobromic acid was weighted, and mixed with ethyl acetate (3.5 mL). Two parts of ethyl acetate were mixed to form a suspension, the suspension was magnetically stirred at room temperature for about 3 days, and the resulting solid was separated by centrifugation and dried in vacuum at room temperature overnight to obtain a solid (318.6 mg). The obtained sample was determined to be a crystal form A of hydrobromide of the multi-substituted benzene ring compound of formula IV by X-ray powder diffraction, the X-ray powder diffraction pattern is shown in FIG. 11, and $^1$H NMR data are as follows: $^1$H NMR (400 MHz, DMSO-d6): δ 11.51 (s, 1H), 8.10 (t, J=5.2 Hz, 1H), 6.65 (d, J=2.4 Hz, 1H), 6.44 (d, J=2.4 Hz, 1H), 5.89 (s, 1H), 4.89-4.84 (m, 1H), 4.27 (d, J=5.2 Hz, 2H), 3.85 (d, J=10.4 Hz, 2H), 3.33 (t, J=10.8 Hz, 2H), 3.01 (dd, J=6.8, 13.6 Hz, 2H), 2.93-2.89 (m, 1H), 2.85-2.76 (m, 4H), 2.42-2.35 (m, 2H), 2.22 (s, 3H), 2.13 (d, J=4.0, 6H), 1.87-1.46 (m, 10H), 0.81 (t, J=7.2 Hz, 3H) ppm.

Figure 12:
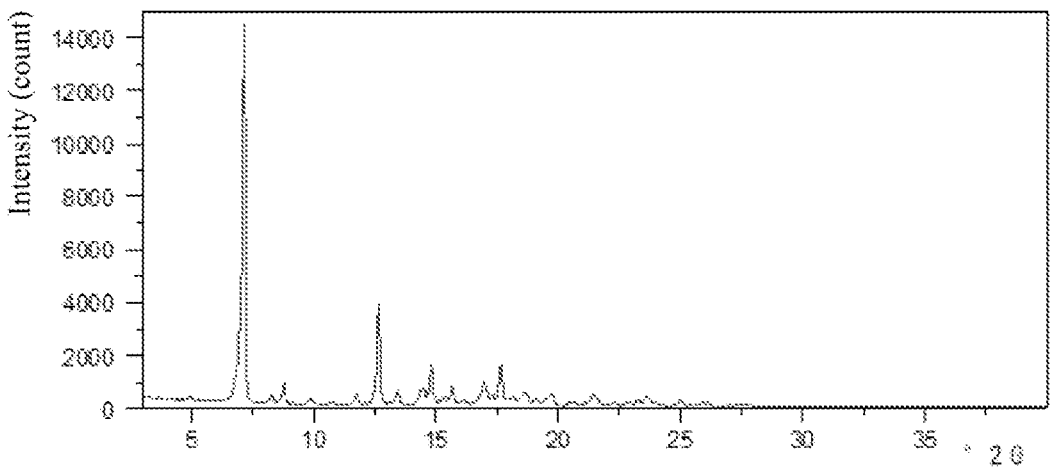
FIG. 12 is an X-ray powder diffraction pattern of a free crystal form D of the multi-substituted benzene ring compound of formula I.
Figure 13:
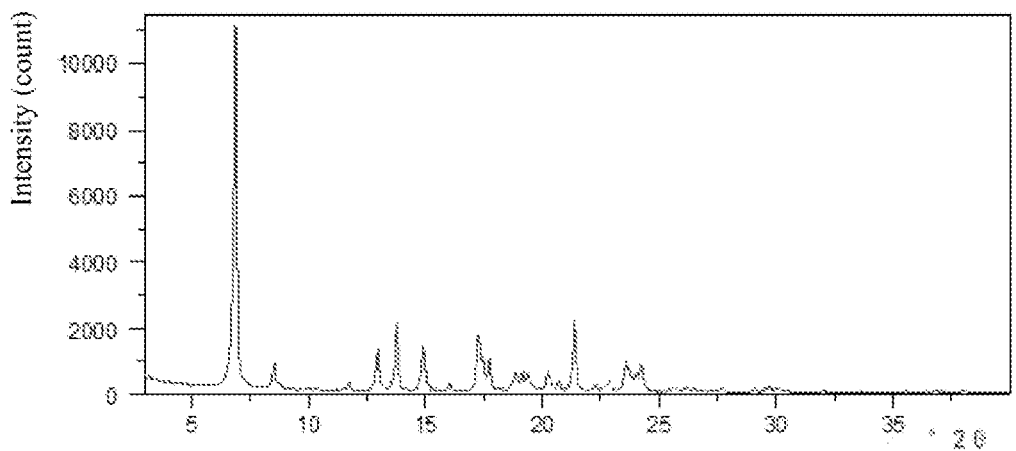
FIG. 13 is an X-ray powder diffraction pattern of a free crystal form C of the multi-substituted benzene ring compound of formula I.
Figure 14:
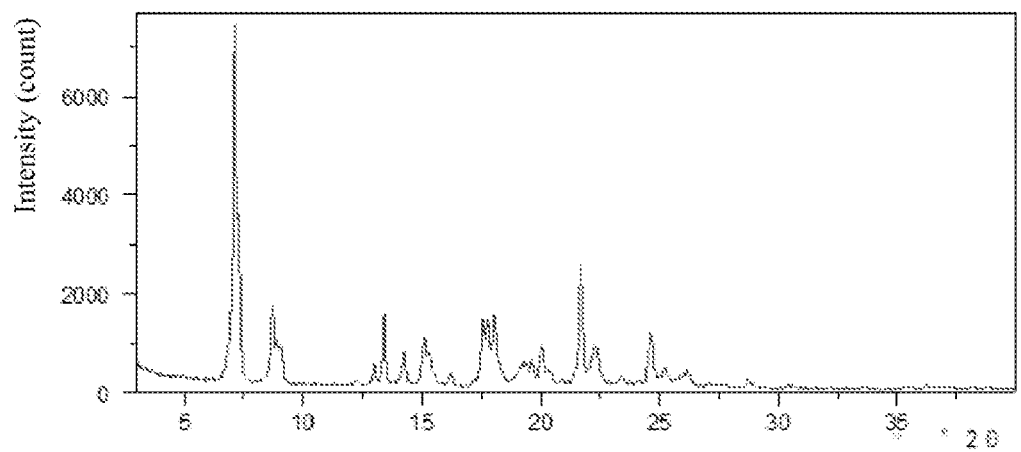
FIG. 14 is an X-ray powder diffraction pattern of a free crystal form E of the multi-substituted benzene ring compound of formula I.
Figure 15:
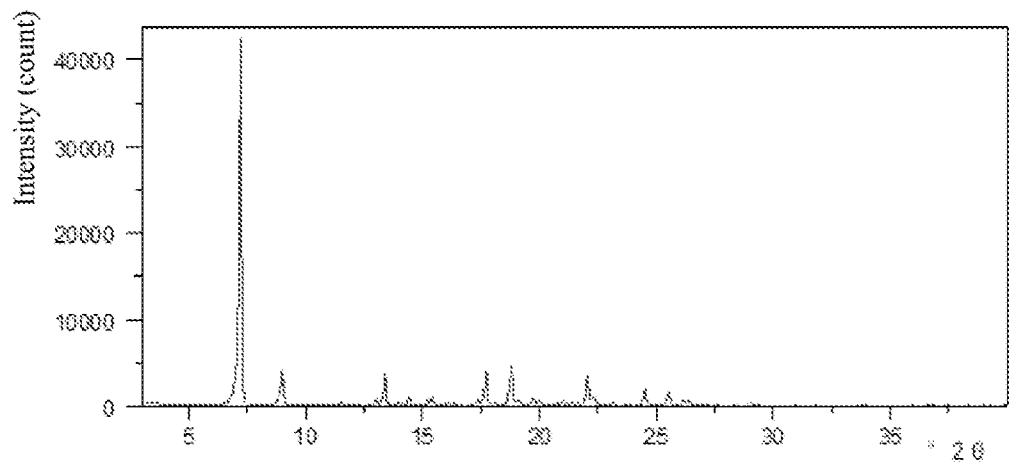
FIG. 15 is an X-ray powder diffraction pattern of a free crystal form F of the multi-substituted benzene ring compound of formula I.
Figure 16:
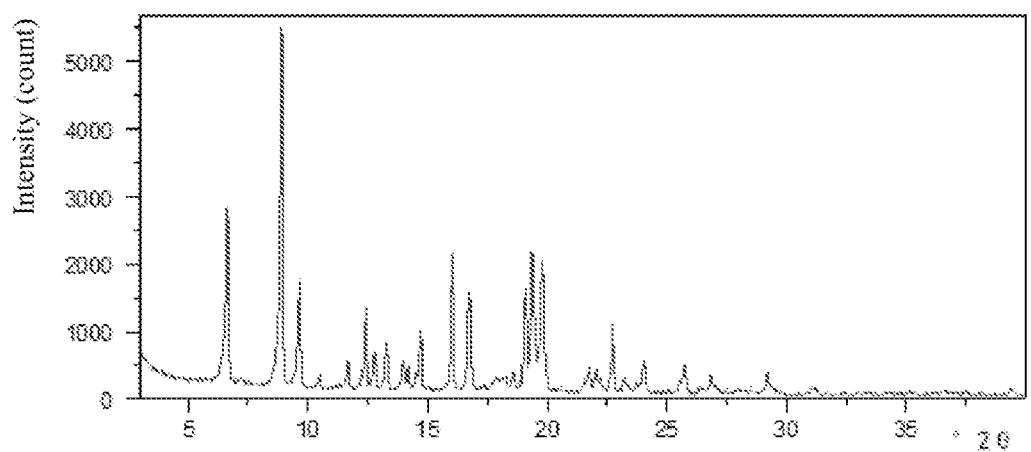
FIG. 16 is an X-ray powder diffraction pattern of a free crystal form G of the multi-substituted benzene ring compound of formula I.

Comparative Example 13: Preparation of Free Crystal Form D of Multi-Substituted Benzene Ring Compound of Formula I 400.7 mg of the crystal form A of the multi-substituted benzene ring compound of formula I obtained in Example 1 was weighed to isopropyl acetate (7 mL), the mixture was stirred at room temperature for 5 days, and the resulting solid was filtered out under vacuum and dried in vacuum at room temperature overnight to obtain a solid (330.0 mg). The obtained sample was determined to be a free crystal form D of formula I by X-ray powder diffraction. The X-ray powder diffraction pattern is shown in FIG. 12, and $^1$H NMR data are as follows: $^1$H NMR (400 MHz, DMSO-d6): δ 11.48 (s, 1H), 8.05 (t, J=5.2 Hz, 1H), 6.59 (d, J=2.4 Hz, 1H), 6.38 (d, J=2.4 Hz, 1H), 5.68 (s, 1H), 4.68-4.68 (m, 1H), 4.24 (d, J=5.2 Hz, 2H), 3.82 (d, J=10.4 Hz, 2H), 3.23 (t, J=10.8 Hz, 2H), 2.98 (dd, J=6.8, 13.6 Hz, 2H), 2.93-2.92 (m, 1H), 2.91-2.90 (m, 1H), 2.29-2.26 (m, 8H), 2.19 (s, 3H), 2.11 (s, 3H), 2.10 (s, 3H), 1.61-1.39 (m, 10H), 0.79 (t, J=7.2 Hz, 3H) ppm.

Comparative Example 14: Free Polymorph Screening of Multi-Substituted Benzene Ring Compound of Formula I Compared with Comparative Example 12, the differences were only in solvent and temperature. The isopropyl acetate and room temperature in the comparative example were replaced by the solvents and temperature shown in Table 17, respectively. The obtained results are shown in Table 17:

TABLE 17

| No. | Solvent | Temperature | Crystal form |
|---|---|---|---|
| 1 | ACN | Room temperature | Free crystal form A |
| 2 | MeOH | | Free crystal form B |
| 3 | MTBE | | Free crystal form C |
| 4 | THF | | Free crystal form E |
| 5 | EtOAc | 50° C. | Free crystal form G |
| 6 | EtOH | | Free crystal form F |
| 7 | ACN | | Free crystal form I |

The obtained samples were determined to be free crystal forms A, B, C, E, F, G and I of the multi-substituted benzene ring compound of formula I by X-ray powder diffraction, respectively. The X-ray powder diffraction patterns of the obtained samples are shown in FIGS. 5-6, FIGS. 13-16 and FIG. 18, respectively.

Figure 17:
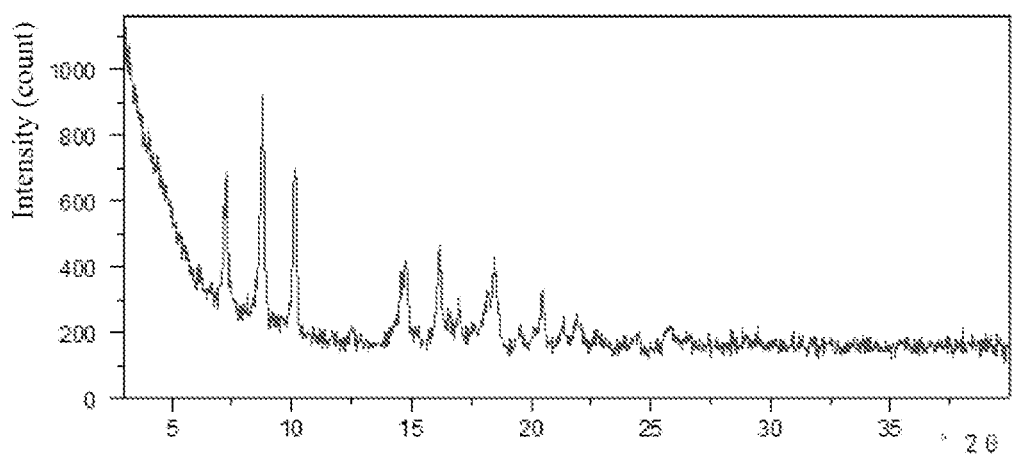
FIG. 17 is an X-ray powder diffraction pattern of a free crystal form H of the multi-substituted benzene ring compound of formula I.
Figure 18:
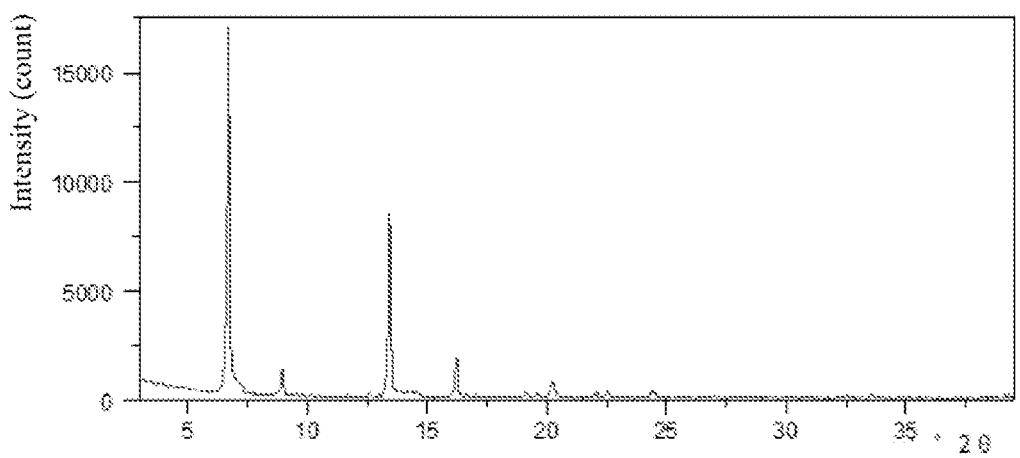
FIG. 18 is an X-ray powder diffraction pattern of a free crystal form I of the multi-substituted benzene ring compound of formula I.

Comparative Example 15: Free Polymorph Screening of Multi-Substituted Benzene Ring Compound of Formula I Compared with the sample (No. 5) in Comparative Example 13, the difference was that the free crystal form G of the multi-substituted benzene ring compound of formula I (No. 5) obtained in Comparative Example 13 was heated to 160° C., and a free crystal form H of the multi-substituted benzene ring compound of formula I could be obtained. The X-ray powder diffraction pattern of the obtained sample is shown in FIG. 17.

Efficacy Example 1: Polymorph Screening of Maleate of Multi-Substituted Benzene Ring Compound of Formula II As in Examples 5-12 and Comparative Examples 1-10 described above, 5 crystal forms were found during the process of screening and crystal form identification, which were named as crystal forms A, B, C, D and E of maleate, respectively, wherein A, B and E were anhydrous crystal forms; C and D were hydrate crystal forms; and the crystal form E of maleate was obtained only at high temperature, and it was retransformed into the crystal form A of maleate after cooling to room temperature.

In order to further explore the mutual transformation relationship among the crystal forms and select more stable crystal forms, suspension competition experiments were carried out on the anhydrous crystal forms A and B of maleate, and suspension competition experiments with different water activities were carried out on the advantageous anhydrous crystal form A of maleate and the hydrate crystal forms C and D of maleate.

Suspension competition experiments on anhydrous crystal forms A and B of maleate were conducted as follows: Four 5-mL vials were taken, IPA (2 mL) and IPAc (2 mL) were added to each vial, and excessive crystal form B of maleate was added. The mixtures were stirred at room temperature/50° C. for 24 h, and then filtered to obtain saturated solutions of the maleate in IPA and IPAc. About 10 mg of a crystal form A/B of maleate was added to each saturated solution, the mixtures were suspended and stirred at room temperature/50° C. for 3 days, and then subjected to the XRPD test. The results are shown in Table 18.

TABLE 18

| Feed crystal form | Solvent | Temperature | Time | Results |
|---|---|---|---|---|
| Crystal form A/B of maleate | IPA | Room temperature | 3 days | Crystal form A of maleate |
| | IPAc | | | Crystal form A of maleate |
| | IPA | 50° C. | | Crystal form A of maleate |
| | IPAc | | | Crystal form A of maleate |

The results show that the crystal form A of maleate was obtained in all systems, and the crystal form A of maleate was more stable than the crystal form B at room temperature/50° C.

Suspension competition experiments on anhydrous crystal form A of maleate and hydrate crystal forms C and D of maleate were conducted as follows: Six 5-mL vials were taken, ethanol solutions (2 mL) with different water activities ($a_w$=0/0.2/0.4/0.6/0.8/1) were added to each vial, and excessive crystal form B of maleate was added. The mixtures were stirred at room temperature for 24 h, and then filtered to obtain saturated solutions. About 10 mg of a crystal form A/C/D of maleate was added to each saturated solution, the mixtures were suspended and stirred at room temperature for 2 days, and then subjected to the XRPD test. Two 5-mL vials were taken, water (2 mL) was added to each vial, and excessive crystal form B of maleate was added. The mixtures were stirred at 50° C./80° C. for 20 h/2 h, and then filtered to obtain saturated solutions. About 10 mg of the crystal form A/C/D of maleate was added to each saturated solution, and the mixtures were suspended and stirred at 50° C./80° C. for 1 day/3.5 h, and then subjected to the XRPD test. The results are shown in Table 19.

TABLE 19

| Feed crystal form | Solvent | Temperature | Time | Result |
|---|---|---|---|---|
| Crystal form A/C/D of maleate | EtOH | Room temperature | 3.5 h | Crystal form A of maleate |
| | EtOH/H$_2$O (96:4, a$_w$ = 0.2) | | | Crystal form A of maleate |
| | EtOH/H$_2$O (91:9, a$_w$ = 0.4) | | | Crystal form C of maleate |
| | EtOH/H$_2$O (82:18, a$_w$ = 0.6) | | | Crystal form C of maleate |
| | EtOH/H$_2$O (70:30, a$_w$ = 0.8) | | | Crystal form C of maleate |
| | H$_2$O | | | Crystal form C of maleate |
| | H$_2$O | 50° C. | 1 day | Crystal form C of maleate |
| | H$_2$O | 80° C. | 3.5 h | Crystal form C of maleate |

The results show that the crystal form A of maleate was obtained when the water activity was less than or equal to 0.2, and the crystal form C of maleate was obtained when the water activity was greater than or equal to 0.4 and when suspended in water at 50° C./80° C. The crystal form C of maleate and the crystal form D of maleate were both transformed into the crystal form A by suspending and stirring in an ethanol solution with a water activity of 0.2 or absolute ethanol at room temperature.

The examples and suspension competition experiments described above show that: among the five crystal forms of maleate, the crystal form E was obtained only at high temperature, and it was retransformed into the crystal form A after cooling to room temperature; the solubility of the crystal form A was similar to that of the crystal form B, but the crystal form A had better solid-state properties, and it was a granular solid (while the crystal form B was a powdery solid); the crystal form A was more stable than the crystal form B, and the crystal form B could be transformed into the crystal form A in various solvents and under various conditions; the crystal form C and the crystal form D were easily transformed into the crystal form A, and the crystal form C was a hydrate and transformed into the crystal form A after being dried at 170° C. Therefore, the crystal form A of maleate is the most stable among the 5 crystal forms of maleate.

Efficacy Example 2: Physical and Chemical Stability

A proper amount of the crystal form A of maleate of the multi-substituted benzene ring compound of formula II was weighted and placed in open vials at 60° C. for one day and under the conditions of 25° C./60% RH and 40° C./75% RH for one week, respectively. The solid samples placed under different conditions were tested for purity by HPLC to assess the chemical stability and for crystal form by XRPD to assess the physical stability. The assessment results were summarized in Table 20.

TABLE 20

| | | | Stability results | | |
|---|---|---|---|---|---|
| Sample | Test conditions | Time | Initial purity (area percentage) | Stability sample purity (area percentage) | Crystal form change |
| Crystal form A | 60° C. | 24 h | 98.86 | 98.79 | Unchanged |
| | 25° C./60% RH | One | | 98.79 | Unchanged |

TABLE 20-continued

| | | | Stability results | | |
|---|---|---|---|---|---|
| Sample | Test conditions | Time | Initial purity (area percentage) | Stability sample purity (area percentage) | Crystal form change |
| of maleate | 40° C./75% RH | week | | 98.79 | Unchanged |

According to the results, it was found that: under three test conditions, the crystal form A of maleate of the multi-substituted benzene ring compound of formula II did not undergo crystal form transformation and chemical purity decrease, indicating that it had better physical and chemical stability.

Efficacy Example 3: Hygroscopicity

Various salt forms of the multi-substituted benzene ring compound of formula I were obtained through the salt form screening experiments. In different salt forms, the crystal form A of maleate of the multi-substituted benzene ring compound of formula II, the crystal form A of succinate of the multi-substituted benzene ring compound of formula III and the crystal form A of hydrobromide of the multi-substituted benzene ring compound of formula IV were selected based on the crystallinity, TGA weight loss, DSC endothermic signals and a molar ratio of salt forming on which the following efficacy experiments were carried out:

The crystal form A of maleate of the multi-substituted benzene ring compound of formula II, the crystal form A of succinate of the multi-substituted benzene ring compound of formula III, the crystal form A of hydrobromide of the multi-substituted benzene ring compound of formula IV and the free crystal form D of the multi-substituted benzene ring compound of formula I (about 10 mg) were taken, and the samples were dried at a set temperature of 25° C. and humidity of 0% RH. After the mass change rate over time was less than 0.002%, the moisture absorption characteristics of the samples when the humidity changed from 0% RH to 95% RH were tested, as well as the moisture desorption characteristics of the samples when the humidity changed from 0% RH to 95% RH to 0% RH were tested, and the humidity change step was 10% RH. The value of the mass change rate dm/dt less than 0.002% was considered as balance equilibration, the mass change rate within 10 min less than 0.002%/min was considered as the equilibration standard during the testing process, and the maximum equilibration time was 3 h. The isothermal moisture sorption/desorption characteristics under this test condition were determined and XRPD test was performed on the samples after the DVS test. The results are shown in Table 21:

TABLE 21

| Solid crystal form | DVS vapor sorption (25° C./80% RH, %) | Crystal form after DVS test |
| --- | --- | --- |
| Crystal form A of maleate | 0.4 | Unchanged |
| Crystal form A of succinate | 2.1 | |
| Crystal form A of hydrobromide | 5.2 | |
| Free crystal form D | 1.3 | |

According to the results, it was found that: among the four crystal forms, the crystal form A of maleate had the lowest hygroscopicity, with the vapor sorption of 0.4% at 25° C./80% RH, almost no hygroscopicity, and the crystal form transformation did not occur after the DVS test.

Efficacy Example 4: Dynamic Solubility

The dynamic solubility of four samples, the crystal form A of maleate of the multi-substituted benzene ring compound of formula II, the crystal form A of succinate of the multi-substituted benzene ring compound of formula III, the crystal form A of hydrobromide of the multi-substituted benzene ring compound of formula IV and the free crystal form D of the multi-substituted benzene ring compound of formula I, was tested in three biological vehicles (SGF, FaSSIF and FeSSIF) and water at 37° C. In the test, 45 mg of the solid and 4.5 mL of the vehicle were mixed in a 5 mL centrifuge tube, then the centrifuge tube was sealed and fixed on a rotating disk at a rotating speed of 40 rpm, and the rotating disk was placed in a 37° C. incubator. Sampling was performed at four time points of 1, 2, 4 and 24 h on equilibration, followed by filtration. The filtrate was separated at each sampling time point to test the concentration and pH, and the solid was tested for crystal form.

According to the results, it was found that: in water, the solution of the crystal form A of succinate was clear (>8.44 mg/mL), the solubility of the crystal form A of maleate was close to that of the crystal form A of hydrobromide (6.99 mg/mL and 4.26 mg/mL, respectively), and the solubility of the free crystal form D was lower (0.016 mg/mL).

In SGF, the solutions of the three salt forms were clear (>7.83 mg/mL), and the solubility of the free crystal form D was relatively lower (6.98 mg/mL).

In FaSSIF, the solubility of the crystal form A of succinate and the crystal form A of maleate was higher (5.39 mg/mL and 4.15 mg/mL, respectively), and the solubility of the crystal form A of hydrobromide and the free crystal form D was lower (1.39 mg/mL and 0.42 mg/mL, respectively).

In FeSSIF, the solutions of the crystal form A of succinate, the crystal form A of maleate and the free crystal form D were clear (>7.35 mg/mL), and the solubility of the crystal form A of hydrobromide was relatively lower (5.33 mg/mL).

Based on the above results, it was found that: in terms of the solubility in 4 media, the crystal form A of maleate and the crystal form A of succinate had relatively better solubility reaching 6 mg/mL in water and SGF. For the formulations with specifications no more than 600 mg, both of the crystal forms met the sink condition of dissolution, could be completely released in vitro, and had solubility reaching 4 mg/mL in FaSSIF and FeSSIF. However, a comprehensive comparison of the hygroscopicity showed that the crystal form A of succinate had higher hygroscopicity, which was not conducive to the development of the subsequent formulation process. The crystal form A of maleate had lower hygroscopicity, the fluidity of API was very good and the angle of repose of a single API was about 400 when D90 was controlled at 200 μm. The crystal form A of maleate could adopt dry-mixing direct compression process as the formulation process, and thus was more suitable to be used as a raw material for the development of the formulation process.

The invention claimed is:

1. A crystal form A of maleate of a multi-substituted benzene ring compound of formula II, having an X-ray powder diffraction pattern comprising diffraction peaks at 2θ angles of 7.39±0.2°, 8.78±0.2°, 13.99±0.2°, 15.21±0.2°, 15.73±0.2°, 17.75±0.2°, 18.51±0.2°, and 21.06±0.2°;

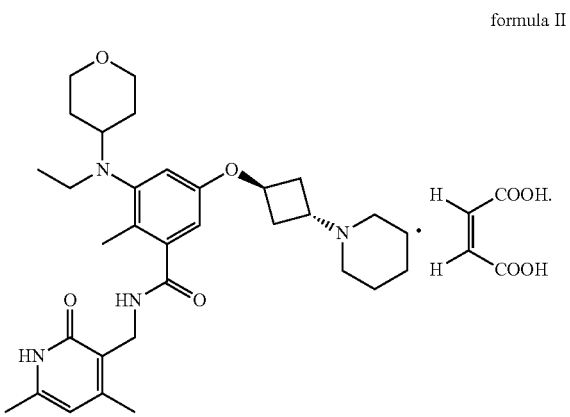

formula II

2. The crystal form A of maleate of the multi-substituted benzene ring compound of formula II according to claim 1, wherein the X-ray powder diffraction pattern further comprises diffraction peaks at one or more of the following 2θ angles: 8.51±0.2° and 16.06±0.2°; or the crystal form A of maleate of the multi-substituted benzene ring compound of formula II has a differential scanning calorimetry pattern comprising main endothermic peaks at 185.3±3° C. and 204.4±3° C.; or the crystal form A of maleate of the multi-substituted benzene ring compound of formula II has a thermogravimetric analysis pattern substantially as shown in FIG. 3.

3. The crystal form A of maleate of the multi-substituted benzene ring compound of formula II according to claim 1, wherein the X-ray powder diffraction pattern further comprises diffraction peaks at one or more of the following 2θ angles: 18.20±0.2° and 20.68±0.2°; or the crystal form A of maleate of the multi-substituted benzene ring compound of formula II has a DSC pattern substantially as shown in FIG. 2.

4. The crystal form A of maleate of the multi-substituted benzene ring compound of formula II according to claim 1, wherein the X-ray powder diffraction pattern further comprises diffraction peaks at one or more of the following 2θ angles: 22.81±0.2° and 25.28±0.2°.

5. The crystal form A of maleate of the multi-substituted benzene ring compound of formula II according to claim 1, wherein the X-ray powder diffraction pattern expressed in terms of 2θ angles is substantially as shown in FIG. 1.

6. A method for preparing the crystal form A of maleate of the multi-substituted benzene ring compound of formula II according to claim 1, wherein the method is method 1, method 2, method 3, method 4, method 5, or method 6; wherein each method of method 1-method 6 comprises a last step of crystallizing to form the crystal form A of the maleate of the multi-substituted benzene ring compound of formula II according to claim 1 method 1: reacting a multi-substituted benzene ring compound of formula I with maleic acid in a solvent A;

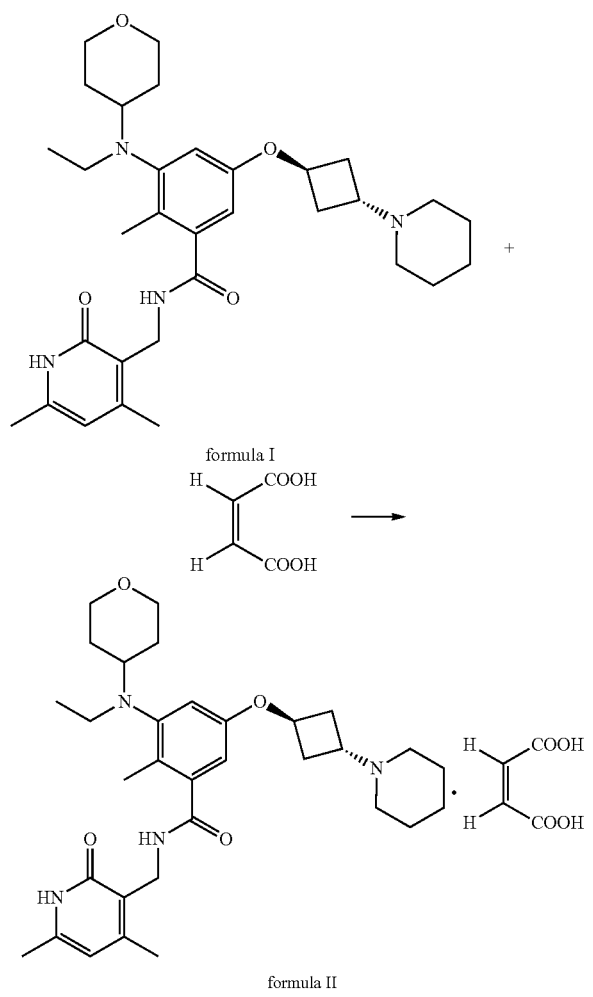

wherein the solvent A is selected from one or more of methyl isobutyl ketone, 2-methyltetrahydrofuran, and ethyl acetate;

method 2: mixing a crystal form B of maleate of the multi-substituted benzene ring compound of formula II with a solvent B to form a suspension solution, and then stirring;

wherein the solvent B is selected from one or more of an alcohol solvent, an ester solvent, a ketone solvent, an ether solvent, a benzene solvent, and a nitrile solvent;

method 3: mixing a crystal form B of maleate of the multi-substituted benzene ring compound of formula II with a mixed solvent of dimethyl sulfoxide and ethyl acetate to form a saturated solution, method 4: dissolving a crystal form B of maleate of the multi-substituted benzene ring compound of formula II in a solvent C, adding a solvent D, wherein the solvent C is selected from one or more of methanol, dimethyl sulfoxide and trichloromethane, and when the solvent C is methanol, the solvent D is ethyl acetate; when the solvent C is dimethyl sulfoxide, the solvent D is isopropyl acetate; when the solvent C is trichloromethane, the solvent D is one or more of ethyl acetate, acetonitrile and butanone;

method 5: performing a gas-liquid infiltration crystallization experiment on a crystal form B of maleate of the multi-substituted benzene ring compound of formula II;

wherein an anti-solvent is selected from one or more of acetone, ethyl acetate and tetrahydrofuran; and method 6: performing a gas-solid infiltration experiment on a crystal form B of maleate of the multi-substituted benzene ring compound of formula II in a solvent E;

wherein the solvent E is one or more of methanol, acetonitrile, acetone, dimethyl sulfoxide, isopropanol, and dimethylformamide;

in methods 2-6, the crystal form B of maleate of the multi-substituted benzene ring compound of formula II has an X-ray powder diffraction pattern expressed in terms of 2θ angles substantially as shown in FIG. 4.

7. The method for preparing the crystal form A of maleate of the multi-substituted benzene ring compound of formula II according to claim 6, wherein
in method 1, the reaction is performed at room temperature; or
in method 1, the reaction is performed for 2-4 days; or
in method 1, a molar ratio of the multi-substituted benzene ring compound of formula I to maleic acid is 1:(1-1.2); or
in method 1, a volume-to-mass ratio of the solvent A to the multi-substituted benzene ring compound of formula I is 15-40 mL/g or
in method 2, the stirring is magnetic stirring; or
in method 2, the stirring is performed at 0-50° C. or
in method 2, the alcohol solvent is ethanol and/or isopropanol; or
in method 2, the ester solvent is ethyl acetate and/or isopropyl acetate; or
in method 2, the ketone solvent is one or more of acetone, butanone, and methyl isobutyl ketone; or
in method 2, the ether solvent is one or more of anisole, cyclopentyl methyl ether and methyl tert-butyl ether, or
in method 2, the benzene solvent is toluene; or
in method 2, the nitrile solvent is acetonitrile; or
in method 2, a volume-to-mass ratio of the solvent B to the crystal form B of maleate of the multi-substituted benzene ring compound of formula II is 20-50 mL/g or
in method 3, a volume ratio of dimethyl sulfoxide and ethyl acetate in the mixed solvent is 1: (2-5), or
in method 3, a volume-to-mass ratio of the mixed solvent to the crystal form B of maleate of the multi-substituted benzene ring compound of formula II is 20-50 mL/g or
in method 4, the solvent D is added dropwise; or
in method 4, a volume ratio of the solvent D to the solvent C is (7-15): 1, or
in method 5, the gas-liquid infiltration crystallization experiment is performed at room temperature; or
in method 6, the gas-solid infiltration experiment is performed at room temperature; or
in method 6, the gas-solid infiltration experiment is performed for 20-50 days or
in method 6, a volume-to-mass ratio of the solvent E to the crystal form B of maleate of the multi-substituted benzene ring compound of formula II is 100-400 mL/g or in methods 3-5, the solution is prepared using a preparation method for a saturated solution; or in method 3, the crystallization is performed by slow cooling from 50° C. to 5° C. at a rate of 0.1-0.5° C./min, and if the solution is still clear, it is transferred to room temperature for volatilization; or in method 5, the crystallization is performed at room temperature or by drying in vacuum at 50° C.; or methods 1-6 comprise the following post-treatment steps: separating and drying, wherein the separating is performed by centrifuging or filtering, and the drying is drying in vacuum.

8. The method for preparing the crystal form A of maleate of the multi-substituted benzene ring compound of formula II according to claim 6, wherein a method for preparing the crystal form B of maleate of the multi-substituted benzene ring compound of formula II comprises the following steps: dissolving a multi-substituted benzene ring compound of formula I and maleic acid in ethanol, cooling for crystallization, and adding methyl tert-butyl ether.

9. The method for preparing the crystal form A of maleate of the multi-substituted benzene ring compound of formula II according to claim 8, wherein in the method for preparing the crystal form B of maleate of the multi-substituted benzene ring compound of formula II, a molar ratio of the multi-substituted benzene ring compound of formula I to maleic acid is 1:(0.95-0.98); or in the method for preparing the crystal form B of maleate of the multi-substituted benzene ring compound of formula II, a mass ratio of ethanol to the multi-substituted benzene ring compound of formula I is (7-9): 1; or in the method for preparing the crystal form B of maleate of the multi-substituted benzene ring compound of formula II, the cooling for crystallization is performed at 15-25° C.; or in the method for preparing the crystal form B of maleate of the multi-substituted benzene ring compound of formula II, a mass ratio of the methyl tert-butyl ether to the multi-substituted benzene ring compound of formula I is (12-15): 1; or the method for preparing the crystal form B of maleate of the multi-substituted benzene ring compound of formula II comprises the following post-treatment steps: filtering and drying.

10. A pharmaceutical composition, comprising the crystal form A of maleate of the multi-substituted benzene ring compound of formula II according to claim 1, and a pharmaceutically acceptable carrier.

11. A method for preventing or treating an EZH2-mediated disease in a subject in need thereof, comprising: administering the crystal form A of maleate of the multi-substituted benzene ring compound of formula II according to claim 1 to the subject.

12. The method according to claim 11, wherein the EZH2-mediated disease is a cancer.

13. The method according to claim 12, wherein the cancer is brain cancer, thyroid cancer, cardiac sarcoma, lung cancer, oral cancer, stomach cancer, liver cancer, kidney cancer, pancreatic cancer, esophageal cancer, nasopharyngeal cancer, laryngeal cancer, colorectal cancer, breast cancer, prostate cancer, bladder cancer, ovarian cancer, uterine cancer, osteocarcinoma, melanoma, glioblastoma, lymphoma, leukemia, adrenal neuroblastoma, skin cancer, and astrocytoma.

14. A method for inhibiting EZH2 in a subject in need thereof, comprising: administering the crystal form A of maleate of the multi-substituted benzene ring compound of formula II according to claim 1 to the subject.

15. The method for preparing the crystal form A of maleate of the multi-substituted benzene ring compound of formula II according to claim 7, wherein in method 1, a molar ratio of the multi-substituted benzene ring compound of formula I to maleic acid is 1:1.07; or in method 1, a volume-to-mass ratio of the solvent A to the multi-substituted benzene ring compound of formula I is 17.6 mL/g; or in method 2, the stirring is performed at room temperature, 50° C. or a temperature cycle of 50° C. to 5° C. at 0.1° C./min, and when the stirring is performed at 50° C., the stirring is performed for 5-8 days; when the stirring is performed at room temperature, the stirring is performed for 25-35 days; when the stirring is performed at a temperature cycle, the stirring is performed at the temperature cycle of 50° C. to 5° C. at 0.1° C./min for 2-4 cycles; or in method 2, the ether solvent is anisole and/or cyclopentyl methyl ether; or in method 2, a volume-to-mass ratio of the solvent B to the crystal form B of maleate of the multi-substituted benzene ring compound of formula II is 25 mL/g; or in method 3, a volume ratio of dimethyl sulfoxide and ethyl acetate in the mixed solvent is 1:3; or in method 3, a volume-to-mass ratio of the mixed solvent to the crystal form B of maleate of the multi-substituted benzene ring compound of formula II is 25 mL/g; or in method 4, a volume ratio of the solvent D to the solvent C is 9:1; or in method 6, the gas-solid infiltration experiment is performed for 30 days; or in method 6, a volume-to-mass ratio of the solvent E to the crystal form B of maleate of the multi-substituted benzene ring compound of formula II is 200 mL/g; or in methods 3-5, the solution is prepared using a preparation method for a saturated solution, and the saturated solution is filtered; or in method 3, the crystallization is performed by slow cooling from 50° C. to 5° C. at a rate of 0.1° C./min, and if the solution is still clear, it is transferred to room temperature for volatilization; or in method 4, there is a solid precipitated after adding the solvent D; if there is no solid precipitated, the temperature is reduced to 5° C.; if there is still no solid precipitated, the solution is transferred to room temperature for volatilization or dried in vacuum at 50° C.

16. The method for preparing the crystal form A of maleate of the multi-substituted benzene ring compound of formula II according to claim 15, wherein in methods 3-5, the solution is prepared using a preparation method for a saturated solution, and the saturated solution is filtered through a filter membrane.

17. The method for preparing the crystal form A of maleate of the multi-substituted benzene ring compound of formula II according to claim 9, wherein in the method for preparing the crystal form B of maleate of the multi-substituted benzene ring compound of formula II, a molar ratio of the multi-substituted benzene ring compound of formula I to maleic acid is 1:0.978; or in the method for preparing the crystal form B of maleate of the multi-substituted benzene ring compound of formula II, a mass ratio of ethanol to the multi-substituted benzene ring compound of formula I is 6.9:1; or in the method for preparing the crystal form B of maleate of the multi-substituted benzene ring compound of formula II, the cooling for crystallization is performed at 20° C.; or in the method for preparing the crystal form B of maleate of the multi-substituted benzene ring compound of formula II, a mass ratio of the methyl tert-butyl ether to the multi-substituted benzene ring compound of formula I is 13:1; or the method for preparing the crystal form B of maleate of the multi-substituted benzene ring compound of formula II comprises the following post-treatment steps: filtering and drying, and methyl tert-butyl ether is further added to a filter cake obtained by filtering for washing.

* * * * *